US011120380B1

(12) United States Patent
Narala

(10) Patent No.: US 11,120,380 B1
(45) Date of Patent: Sep. 14, 2021

(54) SYSTEMS AND METHODS FOR MANAGING INFORMATION RISK AFTER INTEGRATION OF AN ACQUIRED ENTITY IN MERGERS AND ACQUISITIONS

(71) Applicant: MASSACHUSETTS MUTUAL LIFE INSURANCE COMPANY, Springfield, MA (US)

(72) Inventor: Mahender Narala, Edison, NJ (US)

(73) Assignee: MASSACHUSETTS MUTUAL LIFE INSURANCE COMPANY, Springfield, MA (US)

( * ) Notice: Subject to any disclaimer, the term of this patent is extended or adjusted under 35 U.S.C. 154(b) by 600 days.

(21) Appl. No.: 15/934,651

(22) Filed: Mar. 23, 2018

Related U.S. Application Data

(63) Continuation-in-part of application No. 14/295,247, filed on Jun. 3, 2014, now abandoned.

(51) Int. Cl.
*G06Q 10/06* (2012.01)
*G06F 16/25* (2019.01)
*G06F 16/28* (2019.01)
*G06F 16/2458* (2019.01)

(52) U.S. Cl.
CPC ..... *G06Q 10/0635* (2013.01); *G06F 16/2458* (2019.01); *G06F 16/258* (2019.01); *G06F 16/288* (2019.01); *G06Q 10/0637* (2013.01)

(58) Field of Classification Search
CPC ............ G06Q 10/0635; G06Q 10/0637; G06F 16/2458; G06F 16/258; G06F 16/288
USPC ...................................................... 705/7.15
See application file for complete search history.

(56) References Cited

U.S. PATENT DOCUMENTS

| | | | |
|---|---|---|---|
| 7,546,246 B1 | 6/2009 | Stamm et al. | |
| 2002/0138318 A1 | 9/2002 | Ellis et al. | |
| 2002/0169649 A1 | 11/2002 | Lineberry et al. | |
| 2003/0110070 A1* | 6/2003 | De Goeij | G06Q 10/063114 705/7.15 |
| 2003/0137541 A1* | 7/2003 | Massengale | G06F 3/0481 715/764 |
| 2004/0059589 A1 | 3/2004 | Moore et al. | |
| 2004/0078096 A1 | 4/2004 | Maschke | |
| 2004/0181425 A1* | 9/2004 | Schwerin-Wenzel | G06Q 40/02 705/36 R |
| 2004/0254805 A1 | 12/2004 | Schwerin-Wenzel et al. | |
| 2005/0065841 A1 | 3/2005 | Middleton | |

(Continued)

OTHER PUBLICATIONS

Pearce, Jason et al. Strategies for Merging Recordkeeping Systems. Information Management Journal 41.2: 44-48. ARMA International. (Mar./Apr. 2007). 5 pgs.*

(Continued)

*Primary Examiner* — Timothy Padot
(74) *Attorney, Agent, or Firm* — Foley & Lardner LLP

(57) ABSTRACT

Methods and systems for information risk assessments in mergers and acquisitions (M&A) are disclosed. The method may be executed through a risk assessment system that may include a risk management subsystem with a data processing module, a scoring module, and post-integration module, among others. The method may include steps which may provide means for assessing the target company's information risk program at a pre-merger phase, a due diligence phase, an integration phase and a post-integration phase of the M&A process.

14 Claims, 8 Drawing Sheets

(56) References Cited

U.S. PATENT DOCUMENTS

| | | | |
|---|---|---|---|
| 2005/0075916 A1* | 4/2005 | Lathram | G06Q 10/0637 705/7.36 |
| 2005/0096948 A1* | 5/2005 | Chen | G06Q 10/06375 705/7.25 |
| 2005/0114829 A1 | 5/2005 | Robin et al. | |
| 2006/0259336 A1 | 11/2006 | Anas et al. | |
| 2006/0282276 A1* | 12/2006 | Venzon | G06Q 50/18 705/7.42 |
| 2006/0282380 A1 | 12/2006 | Birney et al. | |
| 2007/0226721 A1* | 9/2007 | Laight | G06Q 10/06 717/154 |
| 2008/0016339 A1* | 1/2008 | Shukla | G06F 21/566 713/164 |
| 2008/0133300 A1 | 6/2008 | Jalinous | |
| 2008/0270314 A1 | 10/2008 | Birney et al. | |
| 2008/0270581 A1* | 10/2008 | Ficery | G06Q 40/02 709/220 |
| 2009/0144095 A1 | 6/2009 | Shahi et al. | |
| 2009/0222275 A1 | 9/2009 | Cantor et al. | |
| 2009/0319420 A1 | 12/2009 | Sanchez et al. | |
| 2010/0114634 A1* | 5/2010 | Christiansen | G06Q 30/018 705/7.28 |
| 2010/0153156 A1 | 6/2010 | Guinta et al. | |
| 2010/0228579 A1 | 9/2010 | Holden | |
| 2011/0125672 A1 | 5/2011 | Rosenthal et al. | |
| 2011/0154498 A1 | 6/2011 | Fissel et al. | |
| 2012/0035974 A1* | 2/2012 | Seybold | G06Q 10/06 705/7.26 |
| 2012/0109802 A1 | 5/2012 | Griffin et al. | |
| 2012/0259752 A1 | 10/2012 | Agee | |
| 2012/0278737 A1 | 11/2012 | Frayman et al. | |
| 2013/0253979 A1 | 9/2013 | Williams et al. | |
| 2013/0318577 A1* | 11/2013 | Bulusu | H04L 63/08 726/5 |
| 2016/0232465 A1 | 8/2016 | Kurtz et al. | |

OTHER PUBLICATIONS

IT integration decisions during mergers and acquisitions. Mehta, Manjari Chaitanya. ProQuest Dissertations and Theses ProQuest Dissertations Publishing. (2005).*

Modulo Check-up Tool (product summary), published May 6, 2006 (retrieved from http://web.archive.org/web/20060506073838/ww.modulo.com.br/en_new/Imagens/PDF/CheckupTool_PDF.pdf), 6 pgs.

* cited by examiner

| Information Risk Indicators | Information Risk Components | Questions | Yes/No | Risk Score |
|---|---|---|---|---|
| Best Practice | Best Practice | Do you have Enterprise Information Risk Program? | Yes | 0% |
| | | How much is your annual IT budget allocation? | No | 0% |
| | | What % of IT budget is allocated to Information Risk Program? | No | 4% |
| | Application Risk Assessment | Do you have application inventory documented? | No | 2% |
| | | Do you risk rank your applications? | No | 2% |
| Systems Compliance | Infrastructure Vulnerabilities A. | Do you have an asset management policy or program? | Yes | 0% |
| | Access Mgt. Effectiveness | Do you determine the criticality of all listed assets? | Yes | 0% |
| | | Are requests approved by managers? | Yes | 0% |
| | Overdue Enterprise Continuity Plans | Do you have a well defined Disaster Recovery plan? | Yes | 0% |
| | | Do you have a well defined Business Continuity Plans? | Yes | 0% |
| Data Loss Prevention | Unsecure Transmission | Are Data Loss Prevention parameters monitored? | Yes | 0% |
| | Users Bypassing Secure Mail | Do you transmit any Confidential information unsecurely? | Yes | 0% |
| | | Do you have an policy on email security? | Yes | 0% |
| | Data Integrity | Do you have the capability to Monitor Mail? | Yes | 0% |
| | | Do you classify data based on sensitivity? | Yes | 0% |
| | | Do you classify data based on criticality? | Yes | 0% |
| Third Party Exposure | Vendor risk assessment | Do you have Vendor inventory documented? | Yes | 0% |
| | | Do you have Vendor inventory in a repository? | Yes | 0% |
| | Third Party Control Effectiveness | Do you work with third parties, such as IT service providers, that have access to your information? | No | 10% |
| | | Do third party contracts/agreements include security provisions? | Yes | 0% |
| | Overdue Assessments | Do you have scheduled Third Party Control Assessment process | Yes | 0% |
| | Exceptions | Do you maintain or allow any exceptions on Third Party Service? | Yes | 0% |
| | | Do you maintain or allow any exceptions on Third Party infrastructure? | Yes | 0% |
| Intrusion Protection | Infrastructure Attacks | Do you have a security team that keeps track of all known vulnerabilities? | Yes | 0% |
| | | Do you have an Intrusion Detection System implemented? | Yes | 0% |
| | Malware/Viruses | Do you regularly scan all systems for viruses? | No | 15% |
| | Machines Revamped | Does your company have a virus protection program in place? | Yes | 0% |
| Policy & Standards Awareness | IT Policy | Is there an information risk policy that has been approved by management? | Yes | 0% |
| | | Is there a process to approve exceptions to the information risk policy? | No | 5% |
| | Policy Adherence | Is mandatory training required for all employees for Information Technology (IT) control policy adherence? | Yes | 0% |

*FIG. 3*

| Information Risk Indicators | Information Risk Components | Key Areas | Questions | Yes/No | Risk Score |
|---|---|---|---|---|---|
| Best Practice | Best Practice | Best Practice | Do you have an Enterprise Information Risk Program? | No | 50% |
| | | | How much is your annual IT budget allocation? | No | 0% |
| | | | What % of IT budget is allocated to Information Risk Program? | Yes | 0% |
| | Application Risk Assessment | Application Inventory | Do you have any application inventory documented? | Yes | 0% |
| | | Application Development Vulnerability | Do you develop applications internally? | Yes | 1% |
| | | Risk Ranking of Applications | Do you risk rank your applications? | Yes | 0% |
| | | Client Facing and Financially significant Applications (FSA) | Do you have any application that customers/ users external to your enterprise use? | Yes | 0% |
| | | Penetration testing and vulnerability assessment | Are vulnerability assessments, scans or penetration tests performed on internal or external networks? | Yes | 0% |
| | | High, Medium/Low/Nominal (H/M/L/N) findings and issues | Do You prioritize all your application/system findings/issues in different category like H/M/L/N? | Yes | 0% |
| | Infrastructure Vulnerabilities Assessment | Infrastructure Components / Assets Inventory | Do you have an asset management policy or program? | Yes | 0% |
| | | Process / Tools | Do you have a process to know all open infrastructure vulnerabilities? | Yes | 0% |
| | | Infrastructure Vulnerability Prevention Plan | Do you have processes/tools to certify the infrastructure Network on Annual basis? | Yes | 0% |
| | | Patches on server/desktop | Do you have vulnerability scanner Programs & publish all list of vulnerabilities? | Yes | 0% |
| | | Authentication Model | Do you have patch management coverage for all systems? | Yes | 0% |
| | Access Management Effectiveness | Access Request Process | Do you have any Unique User Identifier to log on each system? | Yes | 0% |
| | | Certifications | Do you have centralized request process / tools? | Yes | 0% |
| | | Termination | Do you have a Certification process? | Yes | 0% |
| | | Transfer | Do you remove users access at Authentication level during termination? | Yes | 0% |
| | | Email | Do you have a transfer process? | Yes | 0% |
| | | Remote Access | Do you allow use to access email outside network? | Yes | 0% |
| Systems Compliance | | Audit Issues | Do you have remote Access Provision? | Yes | 0% |
| | | Security Monitoring | Do you have any Access Violation Audit process? | Yes | 0% |
| | | | Do you have Annual reviews for Systems security Need? | Yes | 0% |
| | | | Do you have process to do Information Security Monitoring? | Yes | 0% |
| | Enterprise Enterprise Continuity Plans | Capacity Planning | Do you have Predictive Capacity Planning for all the Critical Systems? | Yes | 0% |
| | | Disaster Recovery & Business Continuity Plan | Do you have a well defined Disaster Recovery plan? | Yes | 0% |
| | | Exercise Plan | Do you capture all Exercise plan? | Yes | 0% |
| | | Vendor Specific Plans | Do you capture any Vendor Specific Continuity plan? | Yes | 0% |

*FIG. 4*

| Information Risk Indicators | Information Risk Components | Key Areas | Questions | Action Plans | Ta- weeks | Tt- weeks | Risk Score |
|---|---|---|---|---|---|---|---|
| Best Practice | Best Practice | Best Practice | Do you have an Enterprise Information Risk Program? | Act. 1 | 8 | 8 | 100% |
| | | | How much % of IT budget is allocated to Information Risk Program? | Act. 2 | | | |
| | | | What % of IT budget is your annual IT budget allocation? | Act. 3 | | | |
| | | Application Inventory | Do you have any application inventory documented? | Act. 1 | 1 | 2 | 50% |
| | | Application Development | Do you develop applications internally? | Act. 1 | 10 | 10 | 100% |
| | Application Risk Assessment | Application Vulnerability | Do you have a process to measure potential Application risks? | Act. 1 | 2 | 10 | 20% |
| | | Risk Ranking of Applications | Do you risk rank your applications? | Act. 1 | 4 | 4 | 100% |
| | | Client Facing and Financially Significant Applications (FSA) | Do you have any application that customers/users external to your enterprise use? | Act. 1 | 8 | 5 | 100% |
| | | Penetration testing and vulnerability assessments | Are vulnerability assessments, scans or penetration tests performed on internal or external networks? | Act. 1 | 2 | 2 | 100% |
| | | | | Act. 2 | | | |
| | | High, Medium Low findings and issues | Do you prioritize all your application/system findings/issues in different category like HML36? | Act. 1 | 2 | 2 | 100% |
| | | | | Act. 2 | | | |
| | | | | Act. 3 | | | |
| | | | | Act. 4 | | | |
| | | Infrastructure Comp. / Assets Inventory | Do you have an asset management policy or program? | Act. 1 | 8 | 8 | 100% |
| | Infrastructure Vulnerabilities Assessment | Measurement | Do you have a process to know all open Infrastructure vulnerabilities? | Act. 1 | 1 | 1 | 100% |
| | | | | Act. 2 | | | |
| | | Process / Tools | Do you have process/tools to identify the Infrastructure Network on Annual basis? | Act. 1 | 1 | 1 | 100% |
| | | Infrastructure vulnerability | Do you have vulnerability scanner Programs & publish all list of vulnerabilities? | Act. 1 | 5 | 5 | 100% |
| | | Prevention Plan Patches on server/desktop | Do you have patch management coverage for all systems? | Act. 1 | 1 | 1 | 100% |
| | | | | Act. 2 | | | |
| | | Authentication Model | Do you have any Unique User Identifier to log on each system? | Act. 1 | 4 | 4 | 100% |
| | | Authorization Model | Do you have Access points to access at authentication level during | Act. 1 | 2 | 2 | 100% |
| | | | | Act. 2 | | | |
| | | Access Request Process | Do you have centralized request process / tools? | Act. 1 | 2 | 2 | 100% |
| | Access Management Effectiveness | Certifications | Do you have a Certification process? | Act. 1 | 2 | 2 | 100% |
| | | Termination | Do you remove any Access person at authentication level? | Act. 1 | 2 | 2 | 100% |
| | | | | Act. 2 | | | |
| | | Transfer | Do you have a transfer process? | Act. 1 | 1 | 1 | 100% |
| | | Email | Do you allow use to access email outside network? | Act. 1 | 1 | 1 | 100% |
| | | Remote Access | Do you allow any Remote Access Provision? | Act. 1 | 2 | 2 | 100% |
| | | Audit Issues | Do you have Annual reviews for Systems Violation Audit process? | Act. 1 | 1 | 1 | 100% |
| | | Security Monitoring | Do you have process to do Information Security Monitoring? | Act. 1 | 1 | 1 | 100% |
| Systems Compliance | | Capacity Planning | Do you have Predictive Capacity Planning for all the Critical Systems? | Act. 1 | 1 | 1 | 100% |
| | | | | Act. 2 | | | |
| | Overdue Enterprise Continuity Plans | Disaster Recovery & Business Continuity Plan | Do you have a well defined Disaster Recovery plan? | Act. 1 | 5 | 5 | 100% |
| | | Overdue Plan | Do you execute all Overdue plan? | Act. 1 | 1 | 1 | 100% |
| | | Vendor Specific Plans | Do you capture any Vendor specific Continuity plan? | Act. 1 | 1 | 1 | 100% |

FIG. 5

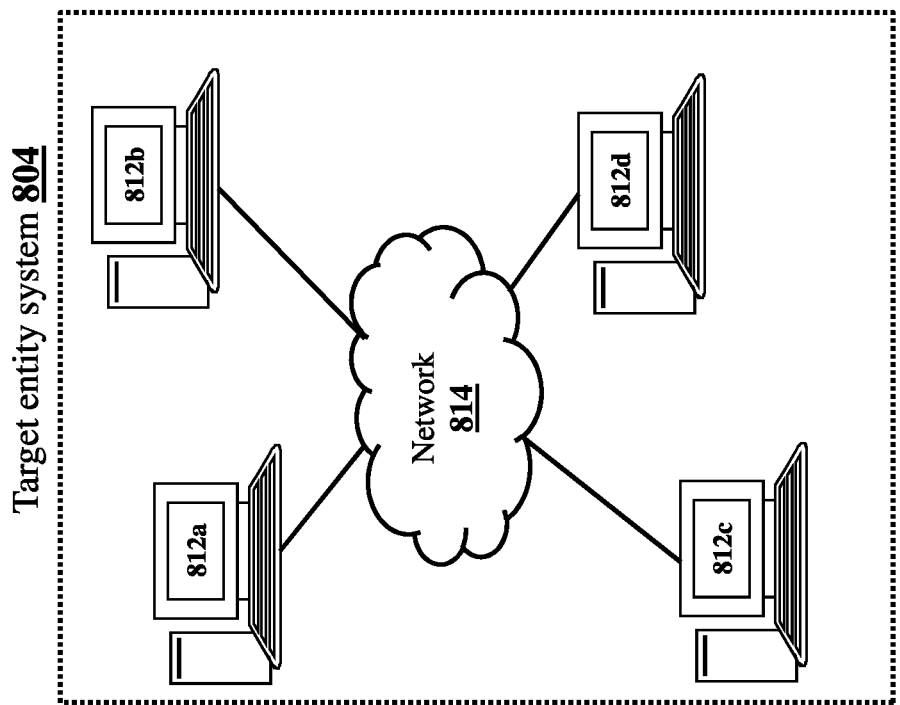
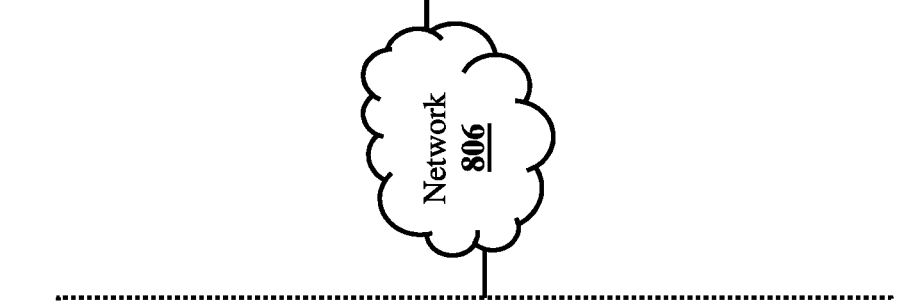
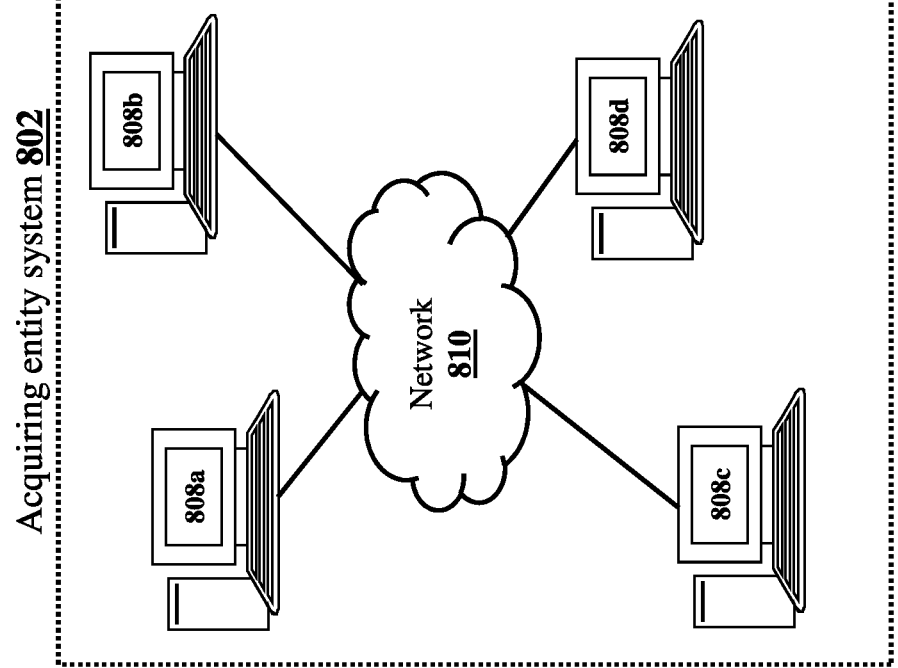
FIG. 8

SYSTEMS AND METHODS FOR MANAGING INFORMATION RISK AFTER INTEGRATION OF AN ACQUIRED ENTITY IN MERGERS AND ACQUISITIONS

CROSS-REFERENCE TO RELATED APPLICATIONS

This application is a continuation-in-part of and claims priority under 35 U.S.C. § 120 to U.S. patent application Ser. No. 14/295,247, filed Jun. 3, 2014, which is hereby incorporated by reference in its entirety.

This application is related to U.S. patent application Ser. No. 14/295,170, filed Jun. 3, 2014, U.S. patent application Ser. No. 14/295,216, filed Jun. 3, 2014, and U.S. patent application Ser. No. 14/295,234, filed Jun. 3, 2014, all of which are hereby incorporated by reference in their entirety.

TECHNICAL FIELD

The present disclosure relates in general to risks assessments, and more specifically to systems and methods for information risk assessments in mergers and acquisitions.

BACKGROUND

Organizations are increasingly using mergers and acquisitions (M&A) as part of their corporate strategy. The benefits associated to this kind of strategy may include lower operation costs, higher revenue and/or profit margin, higher market share, diversification, access to assets of interest, ability to cross-sell products and/or services, among others. During M&A activity, acquiring companies may apply one or a combination of two or more methodologies in a process to evaluate a target company and its assets. For companies that deal with sensitive information, such as companies in the financial, insurance, and health industry, a key aspect during the evaluation process performed in the M&A is the assessment of the information risk programs, through which the target company may be expected to demonstrate some level of compliance. Information risk programs may focus on the protection of sensitive and/or non-public information against their unauthorized modification, transfer, and/or destruction.

Conventionally, companies may use their own templates and/or frameworks to evaluate a target company's information risk program in one or more phases of the M&A life-cycle. However, this methodology may not always give a complete understanding of the target company's critical information security risks, and may not provide the ability to track the progress of one or more actions taken at various phases of M&A life-cycle. All of these drawbacks may result in the failure of M&A efforts and/or increased costs in the alignment process of the target company's information risk program with the acquiring company's information risk program.

SUMMARY

For the aforementioned reasons, there is a need for a system and method for information risk assessment in mergers and acquisitions, which can overcome these and other drawbacks. The present disclosure describes a system and method for determining and mitigating information risk during integration of a new computing environment, which can be implemented in mergers and acquisitions (M&A).

In one embodiment, a computer-implemented method for integrating disparate computer environments is disclosed. The computer-implemented method for integrating disparate computer environments may include determining, by a computer of an acquiring entity, a status of one or more attributes associated with inputs to a questionnaire regarding operation of a target entity computer having a set of subcomponents operable on a target entity network, wherein the attributes associated with the inputs to the questionnaire contain elements of the acquiring entity network and the target entity network for a computer-environment integration of the set of subcomponents into the acquiring entity network. The computer-implemented method for integrating disparate computer environments may further include assigning, by the computer of the acquiring entity, an integration risk score to each subcomponent according to evaluations of the status of one or more attributes for the respective subcomponent. The computer-implemented method for integrating disparate computer environments may further include identifying, by the computer of the acquiring entity, one or more integration gaps corresponding to the integration of the computer environment of the acquiring entity and the target entity determined based on the integration risk score of each subcomponent, wherein the one or more integration gaps are associated with at least one subcomponent of the set of subcomponents. The computer-implemented method for integrating disparate computer environments may further include generating, by the computer of the acquiring entity, an integration project comprising one or more action plans having a set of activities addressing the one or more integration gaps, wherein upon completion of the set of activities, the computer environment of the acquiring entity and the target entity are integrated. The computer-implemented method for integrating disparate computer environments may further include causing, by the computer of the acquiring entity, the at least one subcomponent of the target entity to update according to the one or more action plans, wherein the one or more action plans comprises information for modifying the at least one subcomponent to enable operational integration of the computer environment of the acquiring entity and the target entity.

In another embodiment, a system for integrating disparate computer environments is disclosed. The system may include a computer of an acquiring entity and a computer of a target entity. The computer of the acquiring entity is configured to determine a status of one or more attributes associated with a questionnaire regarding operation of a computer environment associated with a computer of a target entity, wherein the questionnaire is associated with a set of subcomponents modeling a computer-environment integration risk component. The computer of the acquiring entity is further configured to assign an integration risk score to each subcomponent according to evaluations of the status of one or more attributes for the respective subcomponent. The computer of the acquiring entity is further configured to identify one or more integration gaps corresponding to the integration of the computer environment of the acquiring entity and the target entity determined based on the integration risk score of each subcomponent, wherein the one or more integration gaps are associated with at least one subcomponent of the set of subcomponents. The computer of the acquiring entity is further configured to generate an integration project comprising one or more action plans having a set of activities addressing the one or more integration gaps, wherein upon completion of the set of activities, the computer environment of the acquiring entity and the target entity are integrated. The computer of the acquiring entity is further configured to cause the at least one subcomponent of the target entity to update according to the one or more action plans, wherein the one or more action plans comprises information for modifying the at least one subcomponent to enable operational integration of the computer environment of the acquiring entity and the target entity.

In another embodiment, a computer-implemented method for integrating disparate computer environments is disclosed. The computer-implemented method may include generating, by the computer of the acquiring entity, a user interface configured to be displayed on a computer of a target entity to display a questionnaire regarding operation of a computer environment associated with the computer of the target entity, wherein the questionnaire is associated with a set of subcomponents modeling a computer-environment integration risk component. The computer-implemented method may further include upon displaying the user interface on the computer of the target entity, receiving, by the computer of the acquiring entity, one or more electronic inputs corresponding to each subcomponent modeling computer-environment integration risk component associated with the questionnaire. The computer-implemented method may further include querying, by the computer of the acquiring entity, one or more databases associated with the computing environment of the target entity to receive data associated with the set of the subcomponents modeling the computer-environment integration risk component. The computer-implemented method may further include assigning, by the computer of the acquiring entity, an integration risk score to each subcomponent according to each respective one or more electronic inputs corresponding to evaluations for the respective subcomponent and the data received from the one or more databases. The computer-implemented method may further include identifying, by the computer of the acquiring entity, one or more integration gaps corresponding to the integration of the computer environment of the acquiring entity and the target entity determined based on the integration risk score of each subcomponent, wherein the one or more integration gaps are associated with at least one subcomponent of the set of subcomponents. The computer-implemented method may further include generating, by the computer of the acquiring entity, an integration project comprising one or more action plans having a set of activities addressing the one or more integration gaps, wherein upon completion of the set of activities, the computer environment of the acquiring entity and the target entity are integrated. The computer-implemented method may further include causing, by the computer of the acquiring entity, the at least one subcomponent of the target entity to update according to the one or more action plans, wherein the one or more action plans comprises information for modifying the at least one subcomponent to enable operational integration of the computer environment of the acquiring entity and the target entity.

In another embodiment, a system for integrating disparate computer environments is disclosed. The system may include a computer of an acquiring entity and a computer of a target entity. The computer of the acquiring entity is configured to generate a user interface configured to be displayed on a computer of a target entity to display a questionnaire regarding operation of a computer environment associated with the computer of the target entity, wherein the questionnaire is associated with a set of subcomponents modeling a computer-environment integration risk component. The computer of the acquiring entity is further configured to upon displaying the user interface on the computer of the target entity, receive one or more electronic inputs corresponding to each subcomponent modeling computer-environment integration risk component associated with the questionnaire. The computer of the acquiring entity is further configured to query one or more databases associated with the computing environment of the target entity to receive data associated with the set of the subcomponents modeling the computer-environment integration risk component. The computer of the acquiring entity is further configured to assign an integration risk score to each subcomponent according to each respective one or more electronic inputs corresponding to evaluations for the respective subcomponent and the data received from the one or more databases. The computer of the acquiring entity is further configured to identify one or more integration gaps corresponding to the integration of the computer environment of the acquiring entity and the target entity determined based on the integration risk score of each subcomponent, wherein the one or more integration gaps are associated with at least one subcomponent of the set of subcomponents. The computer of the acquiring entity is further configured to generate an integration project comprising one or more action plans having a set of activities addressing the one or more integration gaps, wherein upon completion of the set of activities, the computer environment of the acquiring entity and the target entity are integrated. The computer of the acquiring entity is further configured to cause the at least one subcomponent of the target entity to update according to the one or more action plans, wherein the one or more action plans comprises information for modifying the at least one subcomponent to enable operational integration of the computer environment of the acquiring entity and the target entity.

In another embodiment, a computer-implemented method for integrating disparate computer environments is disclosed. The computer-implemented method may include determining, by a computer of an acquiring entity, a format of data files corresponding to each category of data records stored in one or more databases associated with a computing environment of the acquiring entity. The computer-implemented method may further include querying, by the computer of the acquiring entity, one or more databases associated with a computing environment of a target entity to receive a format of data files corresponding to each category of data records stored in the one or more databases associated with the computing environment of the target entity. The computer-implemented method may further include determining, by the computer of the acquiring entity, a subset of data files corresponding to each category of the data records stored in the or more databases associated with the computing environment of the target entity having the format which is different from the format of the data files in the category of the data records stored in the or more databases associated with the computing environment of the acquiring entity. The computer-implemented method may further include identifying, by the computer of the acquiring entity, one or more integration gaps corresponding to the integration of the computer environment of the acquiring entity and the target entity determined based on format of the subset of data files. The computer-implemented method may further include generating, by the computer of the acquiring entity, an integration project comprising one or more action plans having a set of activities addressing the one or more integration gaps, wherein upon completion of the set of activities, the data records stored in one or more databases associated with a computing environment of the acquiring entity and the target entity are integrated. The computer-implemented method may further include updating, by the computer of the acquiring entity, the format of the subset of data files in accordance with the one or more action plans, wherein the one or more action plans comprises generating an identifier corresponding to each of the subset of data files that is updated that links updated format of each of the subset of data files with original format of each of the subset of data files. The computer-implemented method may further include, upon the computer of the acquiring entity receiving from a user operating a user computing device a request to search a record in an integrated database containing the data records of the acquiring entity and the target entity, determining, by the computer of the acquiring entity, whether the user is from the acquiring entity or the target entity based on user identifier associated with the user. The computer-implemented method may further include upon the computer of the acquiring entity determining that the user is from the target entity, granting, by the computer of the acquiring entity, the user access to generate a query to search the record using keywords associated with the original format of each of the subset of data files; identifying, by the computer of the acquiring entity, the record using the identifier corresponding to the keywords; and displaying, by the computer of the acquiring entity, the record on a user interface of the user computing device.

In another embodiment, a system for integrating disparate computer environments is disclosed. The system may include a computer of an acquiring entity and a computer of a target entity. The computer of the acquiring entity is configured to determine format of data files corresponding to each category of data records stored in one or more databases associated with a computing environment of the acquiring entity. The computer of the acquiring entity is further configured to query one or more databases associated with a computing environment of a target entity to receive a format of data files corresponding to each category of data records stored in the one or more databases associated with the computing environment of the target entity. The computer of the acquiring entity is further configured to determine a subset of data files corresponding to each category of the data records stored in the or more databases associated with the computing environment of the target entity having the format which is different from the format of the data files in the category of the data records stored in the or more databases associated with the computing environment of the acquiring entity. The computer of the acquiring entity is further configured to identify one or more integration gaps corresponding to the integration of the computer environment of the acquiring entity and the target entity determined based on format of the subset of data files. The computer of the acquiring entity is further configured to generate an integration project comprising one or more action plans having a set of activities addressing the one or more integration gaps, wherein upon completion of the set of activities, the data records stored in one or more databases associated with a computing environment of the acquiring entity and the target entity are integrated. The computer of the acquiring entity is further configured to update the format of the subset of data files in accordance with the one or more action plans, wherein the one or more action plans comprises generating an identifier corresponding to each of the subset of data files that is updated that links updated format of each of the subset of data files with original format of each of the subset of data files. The computer of the acquiring entity is further configured to upon the computer of the acquiring entity receiving from a user operating a user computing device a request to search a record in an integrated database containing the data records of the acquiring entity and the target entity, determine whether the user is from the acquiring entity or the target entity based on user identifier associated with the user. The computer of the acquiring entity is further configured to, upon the computer of the acquiring entity determining that the user is from the target entity, grant the user access to generate a query to search the record using keywords associated with the original format of each of the subset of data files; identify the record using the identifier corresponding to the keywords; and display the record on a user interface of the user computing device.

In another embodiment, a computer-implemented method for authenticating a user accessing an integrated database is disclosed. The computer-implemented method may include determining, by a computer of an acquiring entity, a record of each of a first set of users containing each user authorization record to access data records stored in one or more databases associated with a computing environment of the acquiring entity. The computer-implemented method may further include determining, by the computer of an acquiring entity, a record of each of a second set of users containing each user authorization record to access data records stored in one or more databases associated with a computing environment of a target entity. The computer-implemented method may further include generating, by the computer of the acquiring entity, an integration project comprising one or more action plans having a set of activities, wherein upon completion of the set of activities, the data records stored in one or more databases associated with the computing environment of the acquiring entity and the target entity are integrated and stored in the integrated database. The computer-implemented method may further include receiving, by the computer of the acquiring entity, a search query from the user operating a user computing device corresponding to a first record stored in the integrated database. The computer-implemented method may further include determining, by the computer of the acquiring entity, identification information of the user based on a user identifier associated with the user computing device. The computer-implemented method may further include determining, by the computer of the acquiring entity, the user authorization record associated to the user based on the identification information of the user. The computer-implemented method may further include transmitting, by the computer of the acquiring entity, the first record to the user computing device upon determining that the user has authorization to access the first record based on the user authorization record.

In another embodiment, a system for integrating disparate computer environments is disclosed. The system may include a computer of an acquiring entity and a computer of a target entity. The computer of the acquiring entity is configured to determine a record of each of a first set of users containing each user authorization record to access data records stored in one or more databases associated with a computing environment of the acquiring entity. The computer of the acquiring entity is further configured to determine a record of each of a second set of users containing each user authorization record to access data records stored in one or more databases associated with a computing environment of a target entity. The computer of the acquiring entity is further configured to generate an integration project comprising one or more action plans having a set of activities, wherein upon completion of the set of activities, the data records stored in one or more databases associated with the computing environment of the acquiring entity and the target entity are integrated and stored in the integrated database. The computer of the acquiring entity is further configured to receive a search query from the user operating a user computing device corresponding to a first record stored in the integrated database. The computer of the acquiring entity is further configured to determine identification information of the user based on a user identifier associated with the user computing device. The computer of the acquiring entity is further configured to determine the user authorization record associated to the user based on the identification information of the user. The computer of the acquiring entity is further configured to transmit the first record to the user computing device upon determining that the user has authorization to access the first record based on the user authorization record.

Numerous other aspects, features and benefits of the present disclosure may be made apparent from the following detailed description taken together with the drawing figures.

Definitions

As used here, the following terms may have the following definitions:

"Target company" refers to the company being acquired or being solicited for merging.

"Acquiring company" refers to the company which may be trying acquire or merge with a target company.

"Acquired company" refers to the target company after being acquired or merged with the acquiring company.

"M&A committee" refers to one or more individuals who may perform the negotiations with the target company during the first two phases of the merger or acquisition, and may implement the integration of both companies' information risk programs during the last two phases.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIG. 3 is a table illustrating a portion of a pre-merger standard questionnaire, according to yet another embodiment.

FIG. 4 is a table illustrating a portion of a due-diligence standard questionnaire, according to a further embodiment.

FIG. 5 is a table illustrating a portion of an integration project which may be executed in an integration phase, according to another embodiment.

FIG. 8 is a system for integrating disparate computer environments, according to an embodiment.

DETAILED DESCRIPTION

Figure 1:
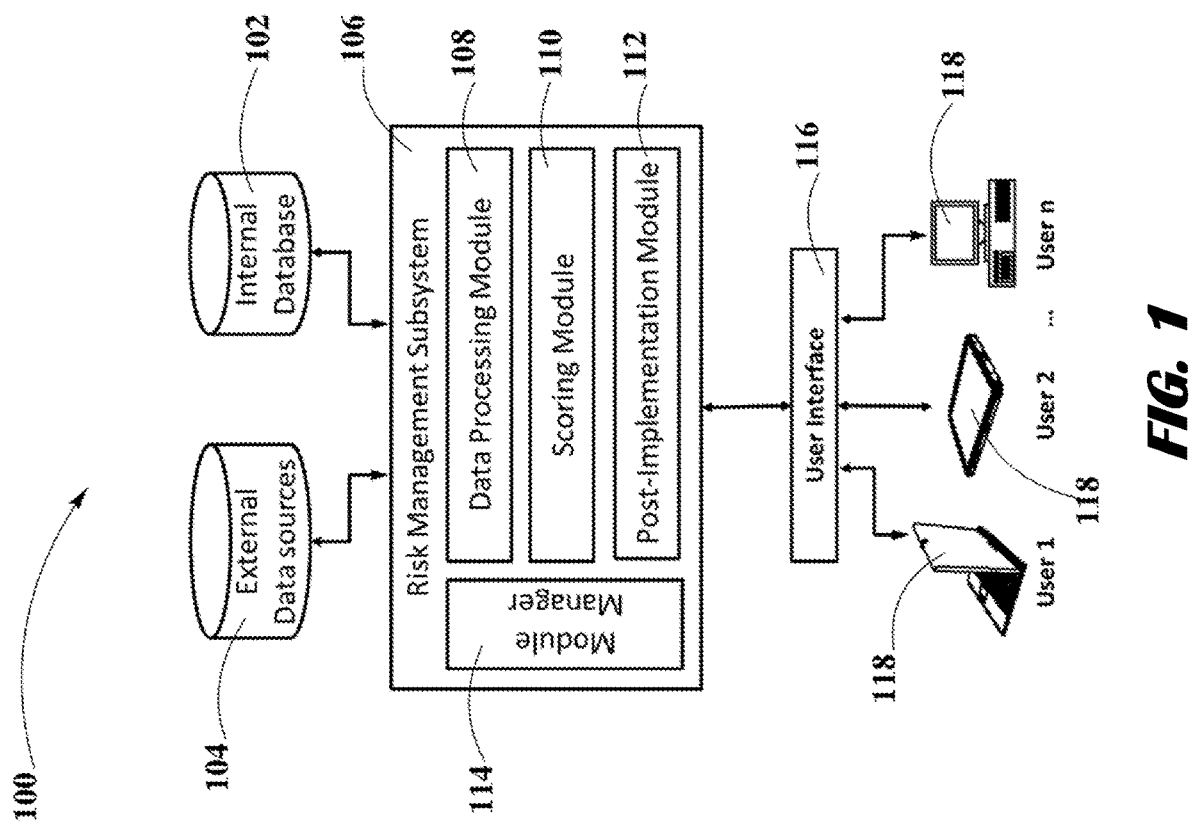
FIG. 1 is a system architecture for assessing information risk programs, according to an embodiment.

The system and method disclosed here may provide standardized means for assessing critical information security risks, which may provide a complete understanding of the target company's risk exposure for informed decision-making. In addition, this method may enable the acquiring company to track the progress of one or more actions taken at various phases within the M&A process. As a result, this method and system may maximize the probability of M&A success.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

According to an embodiment, the method for information risk assessment may be executed through a risk assessment system that may include different components which may dynamically interact with each other through network connections. The system may include one or more external data sources; one or more internal databases; and one or more risk management subsystems that may include one or more data processing modules, one or more scoring modules, one or more post-integration modules, and other suitable software modules. The system may also include any suitable user interface to interact with a M&A committee by means of a computing device.

According to another embodiment, the method for assessing a target company's information risk program may include the phases of pre-merger high level analysis, due diligence, M&A action plans for integration, and post-integration analysis, among others. The Pre-merger high level analysis phase may include the steps of identifying control and risk indicators, assessing risk components, computing a risk score based on assessment, and performing recommendations for appropriate due diligence, among others. The due diligence phase may include the steps of identifying due diligence key risk information metrics, assessing the key risk information metrics, computing a risk score based on assessment, and performing recommendations for appropriate integration, among others. The M&A action plans for integration phase may include the steps of defining action plans for integration, assessing the progress of the action plans, computing a risk score based on assessment, and performing a revision of the M&A action plans, among others. The post-integration analysis phase may include the steps of defining a road map for post-integration findings, assessing the road map, analyzing the compliance and regulatory gaps based on a risk score, and creating a metrics report, among others.

According to yet another embodiment, a pre-merger standard questionnaire may be filled in phase one of the risk assessment method, and may include one or more questions which may provide a high level assessment of the level of compliance associated to a target company's information risk program. Each response of the pre-merger standard questionnaire may be associated to a risk score which scoring module may use to compute an overall risk score for the pre-merger phase of the method.

According to a further embodiment, a due diligence standard questionnaire may be filled in phase two of the risk assessment method, and may include one or more questions which may provide an in-depth assessment of the level of compliance associated to a target company's information risk program. Each response of the due diligence standard questionnaire may be associated to a risk score which scoring module may use to compute an overall risk score for the due diligence phase of the method.

According to another embodiment, an integration project may be executed in phase three of the risk assessment method, and may include one or more action plans which may allow the acquiring company to align their information risk program with the acquired company's information risk program. Each action plan may be associated to a risk score based on the actual time required by an M&A committee to complete each action plan and the planned implementation time-frame for this action plan. Scoring module may use this risk score to compute an overall risk score for the implementation phase of the method.

The present disclosure describes a system and method for information risk assessment, which can be implemented in mergers and acquisitions (M&A). This method may include a four-phase and sixteen-step process to assess the target company's information risk program at various stages of the M&A life-cycle.

FIG. 1 is a system 100 architecture for assessing information risk programs, according to an embodiment. The disclosed system 100 may include different components which may dynamically interact with each other through network connections (not shown in FIG. 1). Network connections may refer to any suitable connection between computers, such as, for example, intranets, local area networks (LAN), virtual private networks (VPN), wireless area networks (WAN), and the internet, among others.

System 100 may include one or more internal databases 102, one or more external data sources 104, and a risk management subsystem 106, among other components. Internal database 102 may store data files generated by one or more software modules operating within risk management subsystem 106. External data sources 104 may include information derived from external sources such as the World Wide Web, external social networks, external consulting, third party providers, external project sources, and any other suitable external source which may be required for the proper operation of system 100. Internal database 102 and external data sources 104 may grant access to risk management subsystem 106 when needed, and may be implemented through known in the art database management systems (DBMS), such as, for example, MySQL, PostgreSQL, SQLite, Microsoft SQL Server, Microsoft Access, Oracle, SAP, dBASE, FoxPro, IBM DB2, LibreOffice Base, FileMaker Pro, and/or any other type of database that may organize collections of data.

Risk management subsystem 106 may be operatively coupled to internal database 102 and external data sources 104 through suitable network connections, and may include one or more data processing 108 modules, one or more scoring 110 modules, one or more post-implementation 112 modules, one or more module managers 114, and any other suitable software module required for the proper operation of risk assessment system 100. Each module within risk management subsystem 106 may include a processing unit for running related algorithms or computer executable program instructions that may be executed by a server, a single computer, or multiple computers in a distributed configuration; and may be configured to interact with one or more modules of the same or different type operating within risk management subsystem 106. Processing unit may include a processor with computer-readable medium, such as a random access memory (RAM) coupled to the processor. Examples of processor may include a microprocessor, an application specific integrated circuit (ASIC), and a field programmable object array (FPOA), among others.

Risk management subsystem 106 may generate a suitable user interface 116 on which a user 118, such as a member of the target company or a member of the acquiring company, may interact with one or more modules operating within risk management subsystem 106 by means of a computing device. The computing device may be any computer type device such as smartphones, desktop computers, laptop computers, tablets, PDAs, and/or another type of processor-controlled device that may receive, process, and/or transmit digital data. In addition, user interface 116 may be configured to collect information from one or more external data sources 104, and receive and/or feed information to one or more users 118.

According to some embodiments of the present disclosure, risk management subsystem 106 may generate a user interface 116 which may collect information from one or more users 118 interacting with user interface 116 via an input device, such as a touch screen, a mouse, a keyboard, a keypad, and others. Data processing 108 module may receive and process this information which may be related to the assessment of a target company's information risk program at various phases of the mergers and acquisitions (M&A) process, and may include standard questionnaire's responses, action plans, recommendations, observations, and any others suitable information. Information risk programs may focus on the protection against the unauthorized modification, transfer, and/or destruction of an individual's sensitive and/or non-public information such as name, last name, social security number, and any other suitable information that can uniquely identify an individual and/or associate them with one or more accounts of a bank, health company, and others. Data processing 108 module may also be configured to automatically retrieve the response to one or more questions of the standard questionnaire at one or more phases of the assessment process, by accessing one or more databases of the target company which may store specific information that may provide a response to those questions. In addition, data processing 108 module may derive from one or more suitable external data sources 104 relevant information required for the proper operation of one or more modules operating within risk management subsystem 106.

Scoring 110 module may retrieve from internal database 102 the responses to one or more close ended questions, assessment plans that may be implemented at various stages of M&A, and/or the percentage of progress in the implementation of those plans, among other suitable information, to assign a risk score to each question and/or action and compute an overall risk score associated to the target company's information risk program level of compliance at various stages of the M&A life-cycle. Post-implementation 112 module may provide means for tracking the progress of one or more assessment plans as part of the post-integration analysis of the M&A. Module manager 114 may interact with one or more modules operating within risk management subsystem 106, control the operation of risk assessment system 100, and process requests from one or more users 118 interacting with a computing device displaying an intelligent user interface 116 generated by system 100, among others.

Internal database 102 may store any suitable information generated from the operation of one or more modules within risk management subsystem 106 and may make it available for further analysis performed by one or modules within risk management subsystem 106, and/or the M&A committee.

Figure 2:
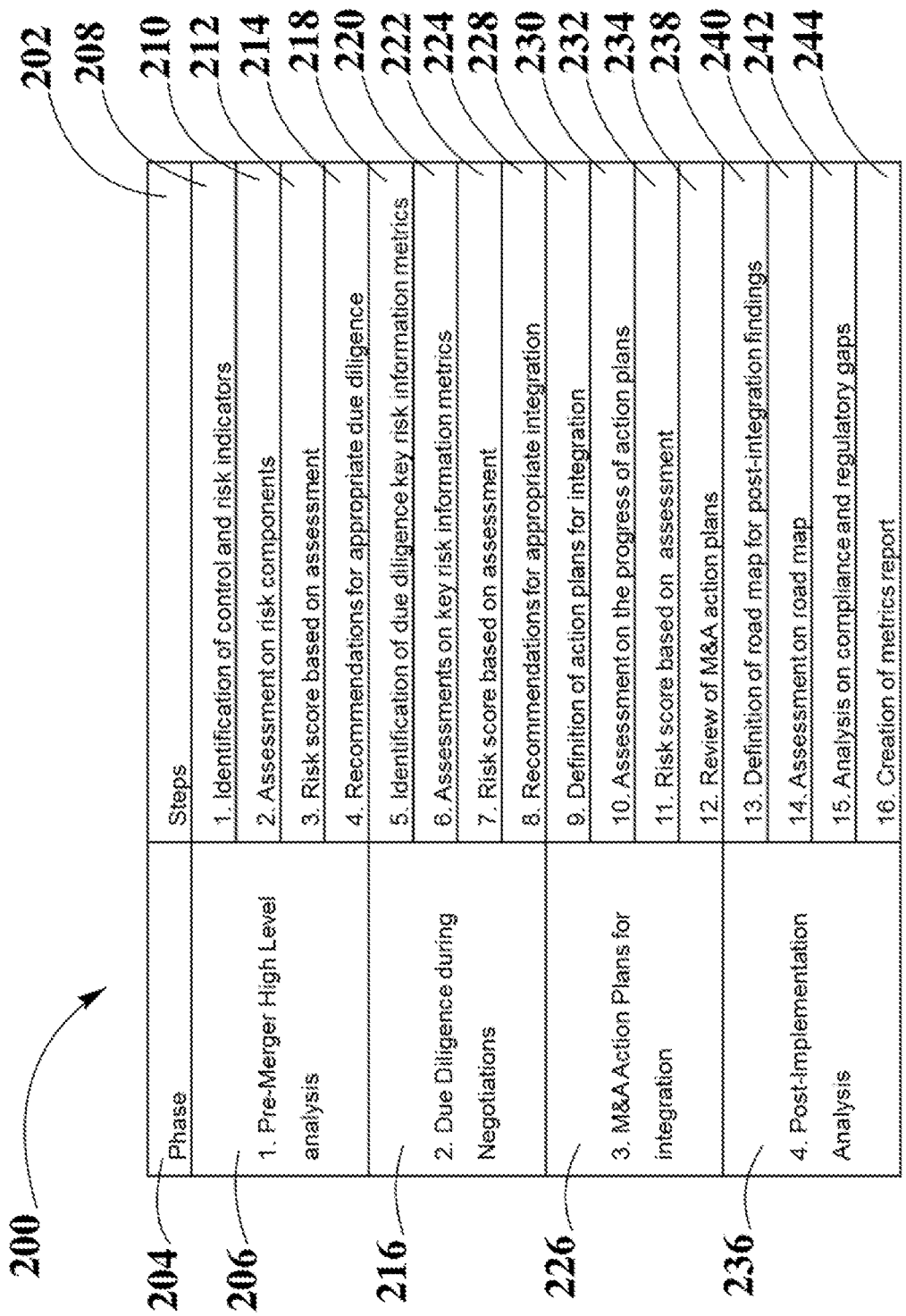
FIG. 2 is a table outlining a method for assessing a target company's information risk program in a four-phase framework, according to another embodiment.

FIG. 2 is a table outlining a method for assessing a target company's information risk program in a four-phase framework 200, according to another embodiment.

The four-phase framework 200 for assessing a target company's information risk program may be executed by a risk assessment system that may include different components which may dynamically interact with each other through network connections. Network connections may refer to any suitable connection between computers, such as intranets, local area networks (LAN), virtual private networks (VPN), wireless area networks (WAN), and the internet, among others.

Risk assessment system may include a risk management subsystem which may be operatively coupled to one or more internal databases and one or more external data sources among other components. Internal database may store data files generated by one or more software modules operating within risk management subsystem. External data sources may include information derived from external sources such as the World Wide Web, external social networks, external consulting, third party providers, external project sources, and any other suitable external source. Internal database and external data sources may grant access to risk management subsystem when needed, and may be implemented through known in the art database management systems (DBMS), such as, for example, MySQL, PostgreSQL, SQLite, Microsoft SQL Server, Microsoft Access, Oracle, SAP, dBASE, FoxPro, IBM DB2, LibreOffice Base, FileMaker Pro, and/or any other type of database that may organize collections of data.

Risk management subsystem may include one or more data processing modules, one or more scoring modules, one or more post-integration modules, one or more module managers, and any other suitable software module. Each module within risk management subsystem may include a processing unit for running related algorithms or computer executable program instructions that may be executed by a server, a single computer, or multiple computers in a distributed configuration. Processing unit may include a processor with computer-readable medium, such as a random access memory (RAM) coupled to the processor. Examples of processor may include a microprocessor, an application specific integrated circuit (ASIC), and a field programmable object array (FPOA), among others.

Risk assessment system may also include a suitable user interface through which one or more users, such as a member of the target company or a member of the acquiring company, may interact with one or more modules operating within risk management subsystem by means of a computing device. The computing device may be any computer type device such as smartphones, desktop computers, laptop computers, tablets, PDAs, and/or another type of processor-controlled device that may receive, process, and/or transmit digital data. In addition, user interface may be configured to collect information from one or more external data sources, and receive and/or feed information to one or more users.

Framework 200 for assessing a target company's information risk program may include four phases 202 which may be executed in sixteen steps 204. Information risk programs may focus on the protection against the unauthorized modification, transfer, and/or destruction of an individual's sensitive and/or non-public information such as name, last name, social security number, and any other suitable information that can uniquely identify an individual and/or associate them with one or more accounts of a bank, health company, and others. Phase one 206 may relate to a high level analysis performed in a pre-merger stage and may include the first four steps of framework 200. In phase one 206 a mergers and acquisitions (M&A) committee may perform a risk assessment on the target company's information risk program and may derive a risk score in order to evaluate the type of information risk program the target company may have, understand the possible gaps, and evaluate additional investments which may be required to align the target company's information risk program with the acquiring company's information risk program.

Step one 208 of framework 200 may include the process of identifying one or more control and information risk indicators for analyzing the target company's information risk program. Step one 208 may also include the definition of a high level plan and an execution strategy, which may include a description of all the activities and their implementation time-frame, required to perform a risk assessment on the target's company information risk program at various phases of the M&A life-cycle.

TABLE 1

Risk Indicators and components.

| Information Risk Indicators | Information Risk Components |
|---|---|
| Best Practice Systems Compliance | Best Practice Application Risk Assessment Infrastructure Vulnerabilities Assessment Access Management Effectiveness Overdue Enterprise Continuity Plans |
| Data Loss Prevention | Unsecure Transmission Users Bypassing Secure Mail Data Integrity |
| Third Party Exposure | Vendor Risk Assessment Third Party Control Effectiveness Overdue Assessments Exceptions |
| Intrusion Protection | Infrastructure Attacks Malware/Viruses Machines Reimaged |
| Policy & Standards Awareness | IT Policy Policy Adherence |

As shown in Table 1, information risk indicators which may be selected for the pre-merger analysis may include industry's best practices, system compliance, data loss prevention, third party exposure, intrusion protection, policy and standards awareness, and others.

Table 1 may also show that the system compliance indicator may include analysis on components such as application risk assessment, infrastructure vulnerabilities assessment, access management effectiveness, overdue enterprise continuity plans, and others. Data loss prevention indicator may include analysis on components such as unsecure transmission, users bypassing secure mail, data integrity, and others. Third party exposure indicator may include analysis on components such as vendor risk assessment, third party control effectiveness, overdue assessments, exceptions, and others. Intrusion protection indicator may include components such as infrastructure attacks, malware/viruses, machine reimaged, and others. Policy and standards awareness indicator may include components such as information technology (IT) policy, policy adherence, and others.

Step two 210 of framework 200 may include the process of gathering information using a suitable pre-merger standard questionnaire with closed ended questions which may be limited to "Yes" or "No" responses and which may be applicable to companies from different industries. This questionnaire may also include one or more open-ended questions that may focus on obtaining from the target company, information related to the amount of annual IT budget and the percentage of that budget which may be allocated to their information risk program, among others. This questionnaire may be electronically available through the data processing module of the risk assessment system, and may focus on a high level analysis of the level of compliance of the target company's information risk program, and may be based on the risk indicators and risk components identified in step one 208.

The pre-merger standard questionnaire may include a set of questions per information risk indicator including questions related to each risk component, and in order to obtain the responses to the suggested questions, the M&A committee may provide one or more members of the target company with access to the data processing module of the risk assessment system. The system may display a user interface with the questions, so the target company may select a response to each of the questions by interacting with the user interface via an input device, such as a touch screen, a mouse, a keyboard, a keypad, and others. The target company may have limited access to other features of the systems, other than the pre-merger standard questionnaire.

In an additional exemplary embodiment, data processing module may be configured to automatically retrieve the response to one or more questions of the pre-merger standard questionnaire, by accessing one or more databases of the target company which may store specific information that may provide a response to those questions. The responses provided by the target company to each suggested question in the pre-merger standard questionnaire may be stored in internal database for further analysis performed by one or more modules operating within risk management subsystem of risk assessment system.

Step three 212 may include the process of computing a risk score as a result of the high level evaluation of the target company's information risk program. The scoring module may derive from internal database the responses provided by the target company to each question of the pre-merger standard questionnaire. Then, scoring module may assign a risk score to each response and this risk score may depend to some extent on the risk associated to each indicator and/or component analyzed, and the type of company analyzed, among others. The risk score may range from 0% to a maximum of 100% per question; however the sum of all the maximum risk scores per set of questions of each risk component may sum up to a maximum of 100%. Then, scoring module may compute the total risk score per information risk indicator by summing the individual risk scores of the responses included in each set of questions, and this total risk score may sum up to a maximum of 100% per information risk indicator. For example, the total risk score for the best practices indicator may be the sum of the individual risk scores of the questions analyzing this indicator. Next, scoring module may assign a weight to each information risk indicator and may compute an overall risk score for phase one 206, which may range from 0% to a maximum of 100%, using Formula (1):

$$\text{Risk score} = \sum_{i=1}^{n} W_i R_i$$

Where n may represent the number of information risk indicators (i) being analyzed, W may represent the weight assigned to each information risk indicator (i), and R may represent the total risk score of each information risk indicator (i). The weight assigned to each information risk indicator may range from 0% to a maximum of 100%; however the sum of all the weights assigned may sum up to a maximum of 100%.

The overall risk score for phase one 206 may provide an understanding of the maturity level associated to the target company's information risk program. If the risk score ranges from 0% to 9%, then the target company's risk is characterized as nominal risk; if the risk score ranges from 10% to 29%, then the target company's risk is characterized as low risk; if the risk score ranges from 30% to 69%, then the target company's risk is characterized as medium risk; and if the risk score ranges from 70% to 100%, then the target company's risk is characterized as high risk.

As an additional tool of information that can provide guidance to the M&A committee in the decision-making process, the scoring module may use the responses to the open ended questions of the pre-merger standard questionnaire related to the amount of IT budget and the percentage of that budget which may be allocated to the target company's information risk program, to compute the incremental investment required by the acquiring company to align their information risk program with the target company's information risk program. This incremental investment required may be computed using Formula (2):

$$\text{Incredmental Investment} = \text{TC's } \% \text{ IRP} - \text{AC's } \% \text{ IRP} * \left( \frac{\text{Questionnaire Score}}{\text{TC's IT Budget}} \right)$$

Where TC's IT budget may represent the target company's IT budget which may be given in millions of dollars, TC's % IRP may represent the percentage of the target company's IT budget which may be allocated to the information risk program, AC's % IRP may represent the percentage of the acquiring company's IT budget which may be allocated to the information risk program, and questionnaire score may represent the risk score obtained from the responses of the target company to the pre-merger standard questionnaire. The percentage of a company's IT budget which may be allocated to the information risk program and the questionnaire score may range from 0% to a maximum of 100%. If the percentage of IT budget that the acquiring company allocates to their information risk program (AC's % IRP) is higher than the percentage of IT budget that the target company allocates to their information risk program (TC's % IRP), then there is no incremental spend. The M&A committee may use the incremental investment information to negotiate with the target company, knowing that there will be a need for additional investment in order to align both information risk programs.

Step four 214 of framework 200 may include the process of performing one or more recommendations which may allow an appropriate due diligence. The M&A committee from the acquiring company may analyze the obtained information concerning the overall risk score for phase one 206, the incremental investment information, and any other suitable information, to identify one or more findings of interest and suggest one or more recommendations which may provide appropriate due diligence in the next phase of the M&A process. The M&A committee may feed this and other information in the data processing module of the risk assessment system by interacting with a computing device displaying the user interface of the system. Then, this information may be stored in internal database to make it available for further analysis required.

At the end of phase one 206, the M&A committee may use the information derived from one or more steps within phase one 206 of framework 200 to assess the target company's information risk program and determine from the information security risk perspective, whether the acquiring company should move forwards with the M&A process and show interest in acquiring the target company or stop the M&A process.

Phase two 216 may relate to a comprehensive appraisal of the target company's information risk program which may take place before the acquiring company acquires the target company, and may include the following four steps of framework 200. In phase two 216 the acquiring company may show a strong interest in acquiring or merging with the target company and may initiate a due diligence process in which the M&A committee may perform a thorough analysis to evaluate the target company's information risk program and the possible gaps which may affect the integration process.

Step five 218 of framework 200 may include the process of identifying one or more key risk information metrics, which may provide a more exhaustive analysis of the target company's information risk program and may also verify the responses obtained in step two 210. Step five 218 may also include the identification of all key stakeholders, the creation of a calendar which may schedule a date to meet each of those stakeholders, and the revision of the project plan for a better tracking.

As shown in Table 2, risk indicators which may be selected for the due diligence analysis may include the industry best practices, system compliance, data loss prevention, third party exposure, intrusion protection, policy and standards awareness, physical security, and others.

Table 2 may also show that the system compliance indicator may include analysis on components such as application risk assessment, infrastructure vulnerabilities assessment, access management effectiveness, overdue enterprise continuity plans, and others. Data loss prevention indicator may include analysis on components such as data loss prevention, unsecure transmission, users bypassing secure mail, data integrity, exceptions, and others. Third party exposure indicator may include analysis on components such as vendor risk assessment, third party control effectiveness, overdue assessments, exceptions, and others. Intrusion protection indicator may include components such as infrastructure attacks, malware/viruses, and others. Policy and standards awareness indicator may include components such as IT policy, policy adherence & training, and others.

In addition, Table 2 may show that application risk assessment component may include analysis on key areas such as application inventory, application development, application vulnerability, risk ranking of applications, client facing and financially significant applications, penetration testing and vulnerability assessment, high/medium/low/

TABLE 2

Risk Indicators, components, and key areas.

| Information Risk Indicators | Information Risk Components | Key Areas | |
|---|---|---|---|
| Best Practice | Best Practice | Best Practice | |
| Systems Compliance | Application Risk Assessment | Application Inventory | Application Development |
| | | Application Vulnerability | Risk Ranking of Applications |
| | | Client Facing and financially significant applications (FSA) | Penetration testing and vulnerabty assessment |
| | | High/Medium/Low/Nominal (H/M/L/N) findings and issues | |
| | Infrastructure Vulnerabilities Assessment | Infrastructure Components/ Assets Inventory | Infrastructure Vulnerability |
| | | Measurement Process/Tools | Prevention Plan Patches on server/desktop |
| | Access Management Effectiveness | Authentication Model | Transfer |
| | | Authorization Model | Email |
| | | Certifications | Remote Access |
| | | Termination | Audit Issues |
| | | Access Request Process | |
| | Overdue Enterprise Continuity Plans | Security | Disaster Recovery & Business Continuity Plan |
| | | Monitoring | Overdue Plan |
| | | Capacity Planning | Vendor Specific Plans |
| Data Loss Prevention | Data Loss Prevention | Data Loss Prevention Program | |
| | Unsecure Transmission | Customers Information | Confidential Information |
| | User Bypassing Secure Mail | Secure Mail | Mail Attachment |
| | Data Integrity | Data Integrity | |
| | Others | Remote Access | Encryption |
| | | External Drive | |
| | Exceptions | Sales | Vendor |
| Third Party Exposure | Vendor Risk Assessment | Vendor Policy | Risk Ranking of Vendors |
| | | Vendor Inventory | Client Facing Systems |
| | | Escrow contracts | |
| | Third Party Control Effectiveness | Third Party Control Inventory | Third Party Control Assessment |
| | Overdue Assessments | Risk Assessment for Overdue | |
| | Exceptions | Service | Infrastructure |
| Intrusion Protection | Infrastructure Attacks | Monitoring, Reporting & Controlling Infrastructure Attacks | |
| | Malware/Viruses | Monitoring, Reporting & Controlling Malware/Virus Attacks | |
| | Others | Prevention System | Firewall Rules |
| Policy & Standards Awareness | IT Policy | Policy & Awareness | |
| | Poilcy Adherence & training | Training program Metrics/Completion | Publishing |
| Physical Security | Physical Security | Personnel Security Maintenance/Disposal | Office Equipments/Assets | nominal findings and issues, and others. Infrastructure vulnerabilities assessment component may include analysis on key areas such as infrastructure components/assets inventory, infrastructure vulnerability, measurement, prevention plan, process/tools, patches on server/desktop, and others. Access management effectiveness component may include analysis on key areas such as authentication model, transfer, authorization model, email, certifications, remote access, termination, audit issues, access request process, and others. Overdue enterprise continuity plans component may include analysis on key areas such as security, disaster recovery and business continuity plan, monitoring, overdue plan, capacity planning, vendor specific plans, and others. Data loss prevention component may include analysis on key areas such as data loss prevention program an others. Unsecure transmission component may include analysis on key areas such as customers information, confidential information, and others. Users bypassing secure mail component may include analysis on key areas such as secure mail, mail attachment, an others. Others component may include analysis on key areas such as remote access, encryption, external drive, and others. Exceptions component may include analysis on key areas such as sales, vendor, and others. Vendor risk assessment component may include analysis on key areas such as vendor policy, risk ranking of vendors, vendor inventory, client facing systems, escrow contracts, and others. Third party control effectiveness component may include analysis on key areas such as third party control inventory, third party control assessment, and others. Overdue assessment component may include analysis on key areas such as risk assessment for overdue and others. Exceptions component may include analysis on key areas such as service, infrastructure, and others. Infrastructure attacks component may include analysis on key areas such as monitoring, reporting, and controlling infrastructure attacks and others. Malware/viruses component may include analysis on key areas such as monitoring, reporting, and controlling malware/virus attacks and others. Others component may include analysis on key areas such as prevention system, firewall rules, and others. IT policy component may include analysis on key areas such as policy and awareness and others. Policy adherence and training component may include analysis on key areas such as training program, publishing, metrics/completion, and others. Physical security component may include analysis on key areas such as personnel security, office equipments/assets, maintenance/disposal, and others.

Step six 220 of framework 200 may include the process of gathering information using a suitable due diligence standard questionnaire with closed ended questions which may be limited to "Yes" or "No" responses and which may be applicable to companies from different industries. This due diligence standard questionnaire may include the questions of the pre-merger standard questionnaire used in step two 210 in order to validate some of the responses provided, and/or additional suitable questions which may provide a comprehensive assessment of the target company's information risk program. This due diligence standard questionnaire may be electronically available through the data processing module of the risk assessment system, and may focus on an in-depth analysis of the target company's information risk program, and may be based on the risk indicators, risk components, and key areas identified in step five 218.

The due diligence standard questionnaire may include a set of questions per information risk indicator including questions related to each key area included on each risk component, and in order to obtain the responses to the suggested questions, the M&A committee may provide one or more members of the target company with access to the data processing module of the risk assessment system. The system may display a user interface with the questions, so the target company may select a response to each of the questions by interacting with the user interface via an input device, such as a touch screen, a mouse, a keyboard, a keypad, and others. The target company may have limited access to other features of the system, other than the due diligence standard questionnaire.

In an additional exemplary embodiment, data processing module may be configured to automatically retrieve the response to one or more questions of the due diligence standard questionnaire, by accessing one or more databases of the target company which may store specific information that may provide a response to those questions. The responses provided by the target company to each suggested question in the due diligence standard questionnaire may be stored in internal database for further analysis performed by one or more modules operating within risk management subsystem of risk assessment system.

Step seven 222 of framework 200 may include the process of computing a risk score as a result of the in-depth evaluation of the level of compliance of the target company's information risk program. The scoring module may derive from internal database the responses provided by the target company to each question of the due diligence standard questionnaire. Then, scoring module may assign a risk score to each response and this risk score may depend to some extent on the risk associated to each indicator, component, and/or key area analyzed, and the type of company analyzed, among others. The risk score may range from 0% to a maximum of 100% per question; however the sum of all the maximum risk scores per set of questions of each risk component may sum up to a maximum of 100%.

Then, scoring module may compute the total risk score per information risk component by summing the individual risk scores of the responses included in each set of questions, and this total risk score may sum up to a maximum of 100% per information risk component. For example, the total risk score for the application risk assessment component may be the sum of the individual risk scores of the questions analyzing this risk component.

Next, scoring module may assign a weight to each information risk component, which scoring module may use to compute the total risk score per information risk indicator that may range from 0% to a maximum of 100%. Scoring module may compute the total risk score per risk indicator using Formula (1) where n may represent the number of risk components per evaluated risk indicator, W may represent the weight assigned to each risk component (i), and R may represent the total risk score per risk component (i). The weight assigned to each risk component may range from 0% to a maximum of 100%; however the sum of all the weights assigned per risk indicator may sum up to a maximum of 100%.

Finally, scoring module may assign a weight to each information risk indicator, which scoring module may use to compute an overall risk score for phase two 216. This overall risk score may range from 0% to a maximum of 100% and scoring module may compute it using Formula (1), where n may represent the number of information risk indicators being analyzed, W may represent the weight assigned to each information risk indicator (i), and R may represent the total risk score of each information risk indicator (i). The weight assigned to each information risk indicator may range from 0% to 100%; however the sum of all the weights assigned may sum up to a maximum of 100%.

The overall risk score for phase two 216 may provide a complete understanding of the maturity level associated to the target company's information risk program. If the risk score ranges from 0% to 9%, then the target company's risk is characterized as nominal risk; if the risk score ranges from 10% to 29%, then the target company's risk is characterized as low risk; if the risk score ranges from 30% to 69%, then the target company's risk is characterized as medium risk; and if the risk score ranges from 70% to 100%, then the target company's risk is characterized as high risk.

In the due diligence phase the target company may provide again information related to the amount of IT budget and the percentage of that budget which they may allocate to their information risk program, therefore validating the information provided in the pre-merger phase; however, if the information provided in the due diligence phase is more accurate than the information provided in the pre-merger phase, then scoring module may use Formula (2) to re-calculate the incremental investment and provide additional guidance information which the M&A committee may use for the negotiations with the target company.

Step eight 224 of framework 200 may include the process of performing one or more recommendations which may allow appropriate integration. The M&A committee from the acquiring company may analyze the obtained information concerning the overall risk score for phase two 216, the incremental investment information, and any other suitable information, to identify one or more findings of interest and suggest one or more recommendations which may provide appropriate integration process in the next phase of the M&A process. The M&A committee may feed this information in the data processing module of the risk assessment system by interacting with a computing device displaying the user interface of the system. Then, this information may be stored in internal database to make it available for further analysis required.

At the end of phase two 216, the M&A committee may use information derived from one or more steps within phase two 216 of framework 200 to evaluate the target company's information risk program, understand the gaps in their program, and determine from the information security risk perspective, whether the acquiring company should move forwards with the M&A process and acquire or merge with the target company, or stop the M&A process.

In phase three 226, the acquiring company may have acquired the target company and the integration process may have begun. Phase three 226 may include the following four steps of framework 200 which may focus on an integration process to align the acquiring company's information risk program with the acquired company's information risk program.

Step nine 228 of framework 200 may include the process of defining a project with one or more action plans which may allow the acquiring company to align their information risk program with the acquired company's information risk program. This action plan may be defined as a result of the responses of the due diligence standard questionnaire and may include a set of activities per key area defined in step five 218 and shown in Table 2. The M&A committee may define and feed the action plans and other suitable information to the risk assessment system which may store this information in internal database to make it available for further analysis as required. Step nine 228 may also include the identification of all key stakeholders, the creation of a calendar which may schedule a date to meet all the stakeholders, and the creation of an execution strategy for the action plans.

Step ten 230 of framework 200 may include the process of assessing the progress of the action plans by defining an implementation time-frame for each set of activities defined per each key area analyzed. This implementation time-frame may facilitate measuring the success of the action plans defined in step nine 228, and may depend to some extent on information such as the risk indicator analyzed, the risk component analyzed, the key area analyzed, the type of company analyzed, and others. The M&A committee may feed the implementation time-frame and other suitable information to the risk assessment system via a suitable input device in order to store this information in internal database and allow the tracking of the progress and success of the action plans, and any other analysis required.

Afterwards, the M&A committee may implement the project including one or more action plans, according to the implementation time-frame. The M&A committee may also keep track on the actual time required to complete each set of activities suggested per key area, which may be used by scoring module to compute a risk score associated to the integration phase.

Step eleven 232 of framework 200 may include the process of computing a risk score based on the assessment of the action plan implementation progress. The scoring module may derive, from the internal database, the implementation time-frame and the actual time required to complete each set of activities suggested per key area. Then, scoring module may compute a risk score per key area, which may range from 0% to a maximum of 100%, using Formula (3):

$$\text{Risk score per key area} = \frac{Ta}{Tt}$$

Where Ta may represent the actual time required by the M&A committee to complete the set of activities suggested for each key area, and Tt may represent the planned implementation time-frame for this set of activities. The actual time required by M&A committee to complete the set of activities and the implementation time-frame may be given in days, weeks or months among other formats.

Next, scoring module may assign a weight to each key area, which scoring module may use to compute a total risk score per risk component that may range from 0% to a maximum of 100%. Scoring module may compute the total risk score per risk component using Formula (1) where n may represent the number of key areas (i) per evaluated risk component, W may represent the weight assigned to each key area (i), and R may represent the risk score per key area (i). The weight assigned to each key area may range from 0% to a maximum of 100%; however the sum of all the weights assigned per risk component may sum up to a maximum of 100%.

Afterwards, scoring module may assign a weight to each risk component, which scoring module may use to compute a total risk score per indicator that may range from 0% to a maximum of 100%. Scoring module may compute the total risk score per risk indicator using Formula (1) where n may represent the number of risk components (i) per evaluated risk indicator, W may represent the weight assigned to each risk component (i), and R may represent the total risk score per risk component (i). The weight assigned to each risk component may range from 0% to a maximum of 100%; however the sum of all the weights assigned per risk indicator may sum up to a maximum of 100%.

Finally, scoring module may assign a weight to each risk indicator, which scoring module may use to compute an overall risk score for phase three 226 that may range from 0% to a maximum of 100%. Scoring module may compute the overall risk score for phase three 226 using Formula (1) where n may represent the number of risk indicators (i), W may represent the weight assigned to each risk indicator (i), and R may represent the total risk score per risk indicator (i). The weight assigned to each risk indicator may range from 0% to a maximum of 100%; however the sum of all the weights assigned may sum up to a maximum of 100%.

The overall risk score for phase three 226 may provide an understanding of the gaps in the integration of the information risk programs of both companies. If the risk score for phase three 226 ranges from 0% to 9%, then the risk is characterized as nominal risk; if the risk score ranges from 10% to 29%, then the risk is characterized as low risk; if the risk score ranges from 30% to 69%, then the risk is characterized as medium risk; and if the risk score ranges from 70% to 100%, then the risk is characterized as high risk.

Step twelve 234 of framework 200 may include the process of performing a revision of the action plans. The M&A committee may analyze the obtained information concerning the overall risk score for phase three 226 and any other suitable information to identify one or more gaps in the integration process and suggest one or more activities in an appropriate action plan for the post-integration phase of the M&A process. The M&A committee may feed this information in the data processing module by interacting with a computing device displaying the user interface of risk assessment system. This information may be stored in internal database to make it available for further analysis required.

Phase four 236 of framework 200 may relate to the post-integration analysis, and may include the last four steps of framework 200.

Step thirteen 238 of framework 200 may include the process of reviewing the results of the integration process and defining a road map for post-integration findings. The M&A committee may analyze the information stored in internal database of risk assessment system and may define a road map to identify one or more areas of improvement which may overcome one or more gaps identified during the integration process. The M&A committee may feed this information in the data processing module by interacting with a computing device displaying the user interface of risk assessment system. This information may be stored in internal database to make it available for further analysis required.

Step fourteen 240 of framework 200 may include the definition of a post-integration project and its implementation timeline, which may provide means for assessing the road map previously defined. The M&A committee may define and feed this information in the data processing module by interacting with a computing device displaying the user interface of the risk assessment system. This information may be stored in internal database to make it available for further analysis required.

TABLE 3

Exemplary post-integration assessment plan.

| Project | | | | Planned Progress | | | | | | | | Weight-age |
|---|---|---|---|---|---|---|---|---|---|---|---|---|
| Plan Name | Task Details | Start Date | End Date | Date 1 | Date 2 | Date 3 | Date 4 | Date 5 | Date 6 | Date 7 | Overall$_t$ | |
| Project Plan 1 | Task 1 | Date 1 | Date 2 | 0% | 100% | 0% | 0% | 0% | 0% | 0% | 100% | 40% |
| | Task 2 | Date 3 | Date 7 | 0% | 0% | 0% | 25% | 25% | 25% | 25% | 100% | 60% |
| Overall$_d$ | | Date 1 | Date 7 | 0% | 40% | 40% | 55% | 70% | 85% | 100% | | 100% |

The post-integration assessment plan may be accomplished by defining one or more project plans as shown in Table 3. The M&A committee may interact with the post-integration module of risk assessment system via a suitable computing device, to define one or more tasks per each project plan, the start date and end date for each of those tasks, the percentage of completion that may be expected each date for each task, and a weightage for each task, as shown in Table 3. This weightage may range from 0% to a maximum of 100%; however, the sum of all weightages may sum up to a maximum of 100%. The percentage of completion that may be expected each date for each task may range from 0% to a maximum of 100%. Table 3 may also provide means for keeping track of the percentage of overall completion that may be expected each date and for each task.

The post-integration module of risk assessment system may compute the overall planned progress expected for each task using Formula (4):

$$\text{Overall}_t = \sum_{i=1}^{d} P_i$$

Where t may represent the evaluated task, d may correspond to the number of dates in the progress plan, and P may correspond to the planned progress expected on each of those dates (d) for the evaluated task (t). The overall planned progress expected for each task may range from 0% to a maximum of 100%. For example, if for task 2 is expected a progress of 25% on dates 4, 5, 6, and 7, then the overall planned progress expected for task 2 may be 100%.

The post-integration module may also compute the overall planned progress expected for each date using Formula (5):

$$\text{Overall}_d = \left( \sum_{i=1}^{t} \frac{(P_{di})(\text{Overall}_t)(W_i)}{TPP} \right) \times TPP + \text{Overall}_{d-1}$$

Where d may correspond to the evaluated dates, t may represent the number of tasks being evaluated, P may correspond to the planned progress expected for each of those tasks (t) on the evaluated dates (d), Overall-i may correspond to the overall planned progress expected for each task (t), W may represent the weightage assigned to each task (t), TPP may correspond to the total progress planned for the post-integration project, and Overall d−1 may represent the overall planned progress expected on the previous date; however, if the previous date is date zero then Overall d−1 may be equal to zero. The overall planned progress expected each date may range from 0% to a maximum of 100%.

In addition, post-integration module may use Formula (6) to compute the value of total progress planned (TPP):

$$TPP = \sum_{i=1}^{t} Overall_i$$

Where t may represent the number of tasks being evaluated and Overall-i may correspond to the overall planned progress expected for each task (t). For example, if the post-integration assessment may include one project plan with two tasks and for each task it is expected a 100% of progress, then TPP may be 200%.

Step fifteen 242 of framework 200 may include the assessment of the post-integration plan which may provide means for compliance and regulatory gap analysis. The M&A committee may use the information defined in step fourteen 240 to evaluate its progress in one or more suitable dates of the post-integration assessment plan. The M&A committee may use the information of Table 3 to create an additional table where the percentage of the actual progress of implementation of the plan may be shown, therefore keeping track of the implementation progress and/or success of the post-integration plan. Then, the M&A committee may feed this information in the data processing module by interacting with a computing device displaying the user interface of risk assessment system. This information may be stored in internal database to make it available for further analysis required.

Next, post-integration module may recalculate the overall progress for each task using Formula (4), and the overall progress on each date using Formula (5) employing the value of total progress planned obtained in step fourteen 240. Then, post-integration module may use Table 3 to create a third table and compute the variation in the values between the planned progress and the actual progress of the post-integration plan. For example, if the expected planned progress for task 1 on date 2 was 100%, but the actual progress was 50%, then the variation in progress may be −50%; on the other hand, if the expected planned progress for task 1 on date 3 was 0%, but the actual progress was 50%, then the variation in progress may be 50%. If the variation is equal to 0%, then the actual progress of the task is equal to the planned progress.

Step sixteen 244 of framework 200 may include the creation of a M&A metrics report. The M&A committee may use information generated in one or more steps of framework 200 to evaluate the results obtained, keep record of one or more significant findings, and generate an information bank. The M&A committee may feed this and other suitable information to the risk assessment system which may store this information in internal database to make it available for further analysis required.

Framework 200 may provide companies with a method that may allow them to assess a target company's information risk program at various phases of the M&A life-cycle. In addition, one or more companies may use framework 200 to assess their own information risk program and define one or more action plans which may help them achieve a determined level of compliance.

FIG. 3 is a table illustrating a portion of a pre-merger standard questionnaire 300, according to yet another embodiment.

Pre-merger standard questionnaire 300 may be filled by one or more individuals interacting with a risk assessment system, which may include different components which may dynamically interact with each other through network connections. Network connections may refer to any suitable connection between computers, such as intranets, local area networks (LAN), virtual private networks (VPN), wireless area networks (WAN), and the internet, among others.

Risk assessment system may include a risk management subsystem which may be operatively coupled to one or more internal databases and one or more external data sources among other components. Internal database may store data files generated by one or more software modules operating within risk management subsystem. External data sources may include information derived from external sources such as the World Wide Web, external social networks, external consulting, third party providers, external project sources, and any other suitable external source. Internal database and external data sources may grant access to risk management subsystem when needed, and may be implemented through known in the art database management systems (DBMS), such as, for example, MySQL, PostgreSQL, SQLite, Microsoft SQL Server, Microsoft Access, Oracle, SAP, dBASE, FoxPro, IBM DB2, LibreOffice Base, FileMaker Pro, and/or any other type of database that may organize collections of data.

Risk management subsystem may include one or more data processing modules, one or more scoring modules, one or more post-integration modules, one or more module managers, and any other suitable software module. Each module within risk management subsystem may include a processing unit for running related algorithms or computer executable program instructions that may be executed by a server, a single computer, or multiple computers in a distributed configuration. Processing unit may include a processor with computer-readable medium, such as a random access memory (RAM) coupled to the processor. Examples of processor may include a microprocessor, an application specific integrated circuit (ASIC), and a field programmable object array (FPOA), among others.

Risk assessment system may also include a suitable user interface through which one or more users, such as a member of the target company or a member of the acquiring company, may interact with one or more modules operating within risk management subsystem by means of a computing device. The computing device may be any computer type device such as smartphones, desktop computers, laptop computers, tablets, PDAs, and/or another type of processor-controlled device that may receive, process, and/or transmit digital data. In addition, user interface may be configured to collect information from one or more external data sources, and receive and/or feed information to one or more users.

Pre-merger standard questionnaire 300 may be filled in phase one of a framework for assessing a target company's information risk program and may include one or more closed ended questions 302 which may be limited to "Yes" or "No" responses 304 and which may be applicable to companies from different industries. Pre-merger standard questionnaire 300 may also include one or more open-ended questions 302 that may focus on obtaining from the target company, information related to the amount of annual IT budget and the percentage of that budget which may be allocated to their information risk program, among others. Pre-merger standard questionnaire 300 may be electronically available through the data processing module of the risk assessment system, and may focus on a high level analysis of the target company's information risk program, and may be based on one or more risk indicators 306 and risk components 308, which a M&A committee may have previously defined.

Pre-merger standard questionnaire 300 may include a set of questions 302 per information risk indicator 306 including questions 302 related to each risk component 308, and in order to obtain responses 304 to the suggested questions 302, the M&A committee may provide one or more members of the target company with access to the data processing module of the risk assessment system. The system may display a user interface with questions 302, so the target company may select a response 304 to each question 302 by interacting with the user interface via an input device, such as a touch screen, a mouse, a keyboard, a keypad, and others. The target company may have limited access to other features of the systems, other than pre-merger standard questionnaire 300.

In an additional exemplary embodiment, data processing module may be configured to automatically retrieve a response 304 to one or more questions 302 of pre-merger standard questionnaire 300, by accessing one or more databases of the target company which may store specific information that may provide responses 304 to those questions 302. Responses 304 provided by the target company to each suggested question 302 in pre-merger standard questionnaire 300 may be stored in internal database for further analysis performed by one or more modules operating within risk management subsystem of risk assessment system.

Scoring module may assign a risk score 310 to each response 304 of pre-merger standard questionnaire 300 and this risk score 310 may depend to some extent on the risk associated to each indicator 306 and/or component 308 analyzed, and the type of company analyzed, among others. Risk score 310 may range from 0% to a maximum of 100% per question 302; however the sum of all the maximum risk scores 310 of each set of questions 302 per risk component 308 may sum up to a maximum of 100%. Then, scoring module may compute the total risk score per information risk indicator 306 by summing the individual risk scores 310 of responses 304 included in each set of questions 302, and this total risk score may sum up to a maximum of 100% per information risk indicator 306.

Next, scoring module may assign a weight to each information risk indicator 306 and may compute an overall risk score for phase one. This overall risk score may range from 0% to a maximum of 100%, and scoring module may compute it based on the weight assigned to each information risk indicator 306, and the total risk score per information risk indicator 306. The weight assigned to each information risk indicator 306 may range from 0% to 100%; however the sum of all the weights assigned may sum up to a maximum of 100%. If risk score 310 ranges from 0% to 9%, then the target company's risk is characterized as nominal risk; if risk score 310 ranges from 10% to 29%, then the target company's risk is characterized as low risk; if risk score 310 ranges from 30% to 69%, then the target company's risk is characterized as medium risk; and if risk score 310 ranges from 70% to 100%, then the target company's risk is characterized as high risk.

TABLE 4

Exemplary risk scores 310 and weights for calculating the overall risk score in phase one, two and three.

| Over All Risk Score | Information Risk Indicators | Weight | Risk |
|---|---|---|---|
| 29% | Best Practice | 25% | 48% |
| | Systems Compliance | 25% | 33% |
| | Data Loss Prevention | 10% | 15% |
| | Third Party Exposure | 10% | 10% |
| | Intrusion Protection | 20% | 20% |
| | Policy & Standards Awareness | 10% | 20% |

As show in Table 4, the overall risk score may be based on the weight assigned to each risk indicator 306 and the total risk per risk indicator 306. This overall risk score for phase one may provide an understanding of the maturity level associated to the target company's information risk program and may provide some guidance to the M&A committee during the negotiation process.

FIG. 4 is a table illustrating a portion of a due diligence standard questionnaire 400, according to a further embodiment.

Due diligence standard questionnaire 400 may be filled by one or more individuals interacting with a risk assessment system, which may include different components which may dynamically interact with each other through network connections. Network connections may refer to any suitable connection between computers, such as intranets, local area networks (LAN), virtual private networks (VPN), wireless area networks (WAN), and the internet, among others.

Risk assessment system may include a risk management subsystem which may be operatively coupled to one or more internal databases and one or more external data sources among other components. Internal database may store data files generated by one or more software modules operating within risk management subsystem. External data sources may include information derived from external sources such as the World Wide Web, external social networks, external consulting, third party providers, external project sources, and any other suitable external source. Internal database and external data sources may grant access to risk management subsystem when needed, and may be implemented through known in the art database management systems (DBMS), such as, for example, MySQL, PostgreSQL, SQLite, Microsoft SQL Server, Microsoft Access, Oracle, SAP, dBASE, FoxPro, IBM DB2, LibreOffice Base, FileMaker Pro, and/or any other type of database that may organize collections of data.

Risk management subsystem may include one or more data processing modules, one or more scoring modules, one or more post-integration modules, one or more module managers, and any other suitable software module. Each module within risk management subsystem may include a processing unit for running related algorithms or computer executable program instructions that may be executed by a server, a single computer, or multiple computers in a distributed configuration. Processing unit may include a processor with computer-readable medium, such as a random access memory (RAM) coupled to the processor. Examples of processor may include a microprocessor, an application specific integrated circuit (ASIC), and a field programmable object array (FPOA), among others.

Risk assessment system may also include a suitable user interface through which one or more users, such as a member of the target company or a member of the acquiring company, may interact with one or more modules operating within risk management subsystem by means of a computing device. The computing device may be any computer type device such as smartphones, desktop computers, laptop computers, tablets, PDAs, and/or another type of processor-controlled device that may receive, process, and/or transmit digital data. In addition, user interface may be configured to collect information from one or more external data sources, and receive and/or feed information to one or more users.

Due diligence standard questionnaire 400 may be filled in phase two of a framework for assessing a target company's information risk program and may include one or more closed ended questions 402 which may be limited to "Yes" or "No" responses 404 and which may be applicable to companies from different industries. Due diligence standard questionnaire 400 may include the questions of a pre-merger standard questionnaire used in a previous phase of the framework to validate some of the responses provided, and may also include additional suitable questions 402 in order to provide a comprehensive assessment of the target company's information risk program. Due diligence standard questionnaire 400 may be electronically available through the data processing module of the risk assessment system, and may focus on an in-depth analysis of the level of compliance associated to the target company's information risk program, and may be based on one or more risk indicators 406, risk components 408, and key areas 410 which a M&A committee may have previously defined.

Due diligence standard questionnaire 400 may include a set of questions 402 per information risk indicator 406 including questions 402 related to each key area 410 and therefore to each risk component 408, and in order to obtain one or more responses 404 to the suggested questions 402, the M&A committee may provide one or more members of the target company with access to the data processing module of the risk assessment system. The system may display a user interface with questions 402, so the target company may select a response 404 to each question 402 by interacting with the user interface via an input device, such as a touch screen, a mouse, a keyboard, a keypad, and others. The target company may have limited access to other features of the systems, other than due diligence standard questionnaire 400.

In an additional exemplary embodiment, data processing module may be configured to automatically retrieve a response 304 to one or more questions 302 of due diligence standard questionnaire 400, by accessing one or more databases of the target company which may store specific information that may provide responses 404 to those questions 402. Responses 304 provided by the target company to each suggested question 402 in due diligence standard questionnaire 400 may be stored in internal database for further analysis performed by one or more modules operating within risk management subsystem of risk assessment system.

Scoring module may assign a risk score 412 to each response 404 of due diligence standard questionnaire 400, and this risk score 412 may depend to some extent on the risk associated to each indicator 406, component 408, and/or key area 410 analyzed, and the type of company analyzed, among others. Risk score 412 may range from 0% to a maximum of 100% per question 402; however the sum of all the maximum risk scores 412 per set of questions 402 of each risk component 408 may sum up to a maximum of 100%. Then, scoring module may compute the total risk score per information risk component 408 by summing the individual risk scores 412 of responses 404 included in each set of questions 402, and this total risk score may sum up to a maximum of 100% per information risk component 408.

Next, scoring module may assign a weight to each information risk component 408, which scoring module may use to compute the total risk score per information risk indicator 406 that may range from 0% to a maximum of 100%. Scoring module may compute the total risk score per risk indicator 406 based on the weight assigned to each risk component 408 and the total risk score per risk component 408. The weight assigned to each risk component 408 may range from 0% to a maximum of 100%; however the sum of all the weights assigned per risk component may sum up to a maximum of 100%.

Finally, scoring module may assign a weight to each information risk indicator 406, which scoring module may use to compute an overall risk score for phase two. This overall risk score may range from 0% to a maximum of 100%, and scoring module may compute it based on the weight assigned to each information risk indicator 406 and the total risk score per information risk indicator 406. The weight assigned to each information risk indicator 406 may range from 0% to 100%; however the sum of all the weights assigned may sum up to a maximum of 100%. If risk score 412 ranges from 0% to 9%, then the target company's risk is characterized as nominal risk; if risk score 412 ranges from 10% to 29%, then the target company's risk is characterized as low risk; if risk score 412 ranges from 30% to 69%, then the target company's risk is characterized as medium risk; and if risk score 412 ranges from 70% to 100%, then the target company's risk is characterized as high risk.

TABLE 5

Exemplary risk scores 412 and weights for the systems compliance risk indicator 406 which may be calculated in phase two.

| Information Risk Indicators | Weight | Risk | Assessment Components | Weight | Risk | Key Areas | Weight | Risk |
|---|---|---|---|---|---|---|---|---|
| System Compliance | 25% | 95% | Application Risk Assessment | 20% | 81% | Application Inventory | 15% | 50% |
| | | | | | | Application Development | 15% | 100% |
| | | | | | | Application Vulnerability | 15% | 20% |
| | | | | | | Risk Ranking of Applications | 15% | 100% |
| | | | | | | Client Facing and Financially significant Applications (FSA) | 15% | 100% |
| | | | | | | Penetration testing and vulnerability | 20% | 100% |
| | | | | | | High/Medium/Low/Nominal (H/M/L/N) findings and Issues | 5% | 100% |

TABLE 5-continued

Exemplary risk scores 412 and weights for the systems compliance risk indicator 406 which may be calculated in phase two.

| Information Risk Indicators | Weight | Risk | Assessment Components | Weight | Risk | Key Areas | Weight | Risk |
|---|---|---|---|---|---|---|---|---|
| | | | Infrastructure Vulnerabilities Assessment | 30% | 100% | Infrastructure Components/Assets Inventory | 20% | 100% |
| | | | | | | Measurement | 15% | 100% |
| | | | | | | Process/Tools | 15% | 100% |
| | | | | | | Infrastructure Vulnerability Prevention Plan | 20% | 100% |
| | | | | | | Prevention Plan | 15% | 100% |
| | | | | | | Patches on server/desktop | 15% | 100% |
| | | | Access Management Effectiveness | 20% | 93% | Authentication Model | 20% | 100% |
| | | | | | | Authorization Model | 10% | 100% |
| | | | | | | Access Request Process | 10% | 100% |
| | | | | | | Certifications | 10% | 100% |
| | | | | | | Termination | 10% | 100% |
| | | | | | | Transfer | 10% | 100% |
| | | | | | | Email | 10% | 100% |
| | | | | | | Remote Access | 10% | 33% |
| | | | | | | Audit Issues | 10% | 100% |
| | | | Overdue Enterprise Continuity Plans | 30% | 100% | Security | 15% | 100% |
| | | | | | | Monitoring | 15% | 100% |
| | | | | | | Capacity Planning | 15% | 100% |
| | | | | | | Disaster Recovery & Business Continuity Plan | 15% | 100% |
| | | | | | | Overdue Plan | 15% | 100% |
| | | | | | | Vendor Specific Plans | 25% | 100% |

As show in Table 5, the total risk score per risk component 408 may be based on the weight assigned to each key area 410 and the total risk per key area 410. Similarly, the total risk per risk indicator 406 may be based on the weight assigned to each risk component 408 and the total risk per risk component 408. The overall risk score obtained for phase two may provide a complete understanding of the maturity level associated to the target company's information risk program and may provide some guidance to the M&A committee during the negotiation process.

FIG. 5 is a table illustrating a portion of an integration project 500 which may be executed in an integration phase, according to another embodiment.

The progress of integration project 500 may be controlled through a risk assessment system, which may include different components which may dynamically interact with each other through network connections. Network connections may refer to any suitable connection between computers, such as intranets, local area networks (LAN), virtual private networks (VPN), wireless area networks (WAN), and the internet, among others.

Risk assessment system may include a risk management subsystem which may be operatively coupled to one or more internal databases and one or more external data sources among other components. Internal database may store data files generated by one or more software modules operating within risk management subsystem. External data sources may include information derived from external sources such as the World Wide Web, external social networks, external consulting, third party providers, external project sources, and any other suitable external source. Internal database and external data sources may grant access to risk management subsystem when needed, and may be implemented through known in the art database management systems (DBMS), such as, for example, MySQL, PostgreSQL, SQLite, Microsoft SQL Server, Microsoft Access, Oracle, SAP, dBASE, FoxPro, IBM DB2, LibreOffice Base, FileMaker Pro, and/or any other type of database that may organize collections of data.

Risk management subsystem may include one or more data processing modules, one or more scoring modules, one or more post-integration modules, one or more module managers, and any other suitable software module. Each module within risk management subsystem may include a processing unit for running related algorithms or computer executable program instructions that may be executed by a server, a single computer, or multiple computers in a distributed configuration. Processing unit may include a processor with computer-readable medium, such as a random access memory (RAM) coupled to the processor. Examples of processor may include a microprocessor, an application specific integrated circuit (ASIC), and a field programmable object array (FPOA), among others.

Risk assessment system may also include a suitable user interface through which one or more users, such as a member of the target company or a member of the acquiring company, may interact with one or more modules operating within risk management subsystem by means of a computing device. The computing device may be any computer type device such as smartphones, desktop computers, laptop computers, tablets, PDAs, and/or another type of processor-controlled device that may receive, process, and/or transmit digital data. In addition, user interface may be configured to collect information from one or more external data sources, and receive and/or feed information to one or more users.

Integration project 500 may be planned and executed in phase three of a framework for assessing a target company's information risk program and may include one or more action plans 502 which may allow the acquiring company to align their information risk program with the acquired company's information risk program. Integration project 500 may include a set of activities 502 per key area 504 of each information risk component 506 included in each information risk indicator 508, and these sets of activities 502 may have been previously defined by a M&A committee according to questions 510 of a due diligence standard questionnaire and the responses of questions 510 provided by the target company. The M&A committee may also define an implementation time-frame 512 to implement each set of activities 502, and this time-frame 512 may depend to some extent on information such as risk indicator 508 analyzed, the risk component 506 analyzed, key area 504 analyzed, type of company analyzed, and others. The M&A committee may feed the implementation time-frame 512 and other suitable information to the risk assessment system via a suitable input device in order to store this information in internal database and allow the tracking of the progress and success of the action plans 502, and among any other analysis required.

Next, the M&A committee may implement project 500 including one or more action plans 502, according to the implementation time-frame 512 and may keep track of a actual 514 time required to implement each action plan 502. Then, scoring module may compute a risk score 516 per key area 504 based on actual 514 time required by the M&A committee to complete the set of activities 502 suggested for each key area 504 (Ta) and the planned implementation time-frame 512 for this set of activities 502 (Tt). Actual 514 time required by M&A committee to complete the set of activities 502 and the implementation time-frame 512 may be given in days, weeks or months among others.

Subsequently, scoring module may assign a weight to each key area 504, which scoring module may use to compute a total risk score per risk component 506 that may range from 0% to a maximum of 100%. Scoring module may compute the total risk score per risk component 506 based on the weight assigned to each key area 504 and the risk score per key area 504. The weight assigned to each key area 504 may range from 0% to a maximum of 100%; however the sum of all the weights assigned per risk component 506 may sum up to a maximum of 100%.

Next, scoring module may assign a weight to each information risk component 506, which scoring module may use to compute the total risk score per information risk indicator 508 that may range from 0% to a maximum of 100%. Scoring module may compute the total risk score per risk indicator 508 based on the weight assigned to each risk component 506 and the total risk score per risk component 506. The weight assigned to each risk component 506 may range from 0% to a maximum of 100%; however the sum of all the weights assigned per risk indicator 508 may sum up to a maximum of 100%.

Finally, scoring module may assign a weight to each information risk indicator 508, which scoring module may use to compute an overall risk score for phase two. This overall risk score may range from 0% to a maximum of 100% and scoring module may compute it based on the weight assigned to each information risk indicator 508, and the total risk score per information risk indicator 508. The weight assigned to each information risk indicator 508 may range from 0% to 100%; however the sum of all the weights assigned may sum up to a maximum of 100%. If risk score 516 ranges from 0% to 9%, then the target company's risk is characterized as nominal risk; if risk score 516 ranges from 10% to 29%, then the target company's risk is characterized as low risk; if risk score 516 ranges from 30% to 69%, then the target company's risk is characterized as medium risk; and if risk score 516 ranges from 70% to 100%, then the target company's risk is characterized as high risk.

The overall risk score for phase three may provide an understanding of the gaps in the integration of the information risk programs of both companies in the M&A process, and may provide some guidance to the M&A committee during the post-integration phase.

Example #1 refers to the calculation of the overall risk score employing Formula (1) and the values of Table 4. For example assuming that scoring module sums the individual risk scores of the responses included in each set of questions and shows that there is a risk of 48% for the best practices indicator, a risk of 33% for the systems compliance indicator, a risk of 15% for the data loss prevention indicator, a risk of 10% for the third party exposure indicator, a risk of 20% for the intrusion protection indicator, and a risk of 20% for the policy and standard awareness indicator; and assuming that the acquiring company is using a weight of 25%, 25%, 10%, 10%, 20%, and 10% for those risk indicators respectively; then, scoring module may use Formula (1) to compute the overall risk score, and show that there is a risk of 29% associated to the target company's information risk program, which is characterized as low risk.

Example #2 refers to the calculation of the total risk score per information risk indicator employing Formula (1) and the values of Table 5. For example, assuming that scoring module sums the individual risk scores of the responses included in each set of questions and shows that there is a risk of 12% for the application risk assessment component, a risk of 4% for the infrastructure vulnerabilities assessment component, a risk of 5% for the access management effectiveness component, and a risk of 0% for the overdue enterprise continuity plans component; and assuming that the acquiring company is using a weight of 20%, 30%, 20%, and 30% for those risk indicators respectively; then, scoring module may use Formula (1) to compute the total risk score for the systems compliance risk indicator, and show that there is a risk of 5%. Scoring module may use this total risk score for the system compliance indicator and the 25% weight assigned to it, to compute the overall risk score in a similar operation.

Example #3 refers to the calculation of the risk score per key area employing Formula (3). For example, a M&A committee may have defined in step nine of phase three, a time-frame of two weeks for the implementation of an action plan related to the application inventory key area of the application risk assessment component which may be included in the systems compliance indicator. If the M&A committee is able to implement this action plan in one week, then, using Formula (3) to compute the key area risk score, scoring module may show that there is a risk of 50% associated to the application inventory key area, which may be characterized as medium risk.

Example #4 refers to the calculation of the incremental investment employing Formula (2). For example, based on the responses obtained from the target company, the M&A committee may assume that a target company's information technology budget is US $ 100,000,000 and that they allocate 7.5% of this budget to their information risk program which may have a risk score of 50%. Using this information and Formula (2), scoring module may compute the incremental investment which may correspond to US $1,250,000. This incremental investment may indicate an additional financial investment which the acquiring company may require to align their information risk program with the target company's information risk program.

Figure 6:
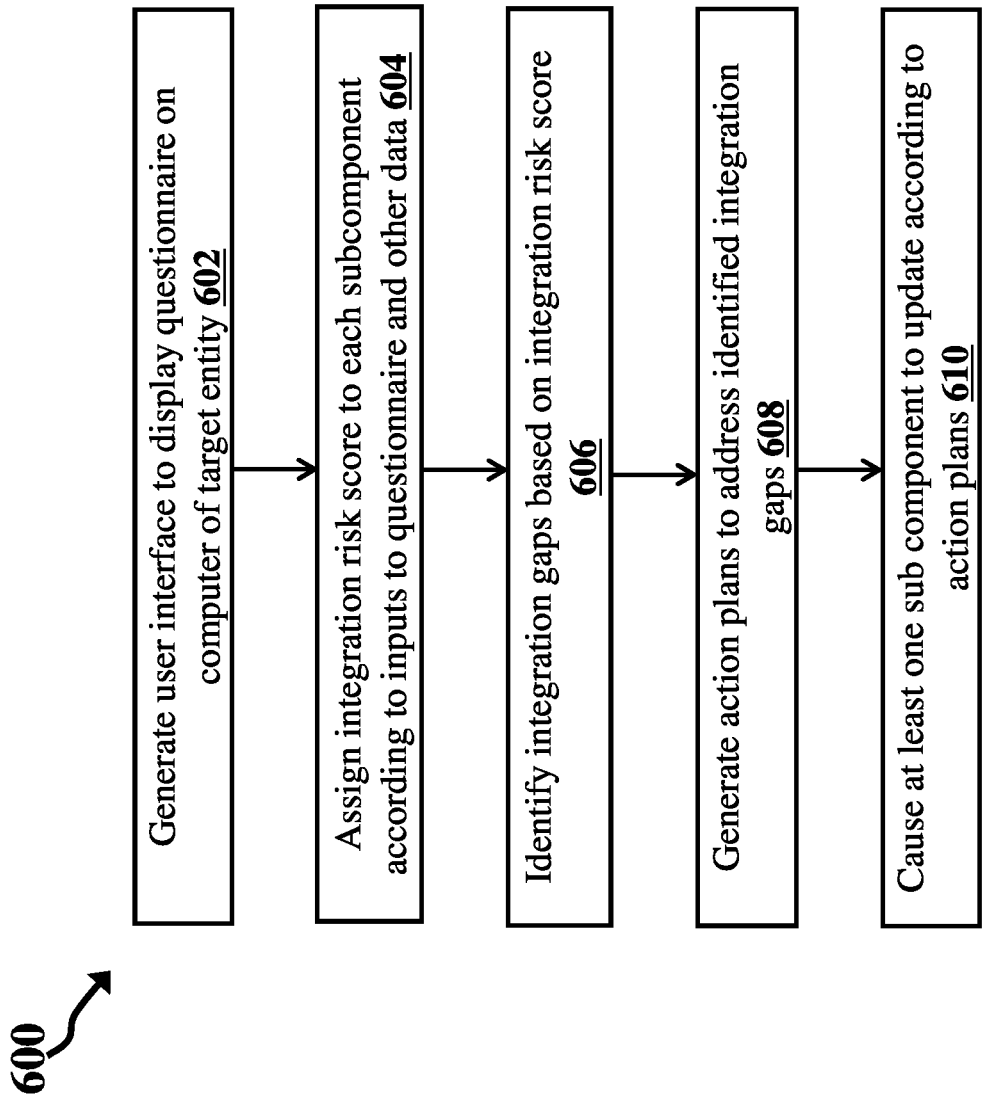
FIG. 6 illustrates execution for integrating disparate computer environments, according to an exemplary embodiment.

FIG. 6 shows execution steps for integrating disparate computer environments, according to an exemplary method 600. The exemplary method 600 shown in FIG. 6 comprises execution steps 602, 604, 606, 608, and 610. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 600 of FIG. 6 is described as being executed by a single computer, referred to as a computer of an acquiring entity in this example, and this computer of the acquiring entity configured for this integration may comprise the components and functionality of the risk management subsystem described in FIG. 1. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as the computer of the acquiring entity described herein. In an alternative embodiment, the computer of the acquiring entity can instead be a computer of the target entity.

In a first step 602, a computer of an acquiring entity may be configured to generate a user interface, which is configured to be displayed on a computer of a target entity. The computer of the acquiring entity may be further configured to generate a questionnaire regarding operation of a computer environment associated with the computer of the target entity. In some embodiments, the questionnaire may include a set of questions per information risk indicator including questions related to each risk component.

The computer of the acquiring entity may then display the questionnaire associated with a set of subcomponents (e.g., hardware and/or software) for a computer-environment integration risk component on the user interface of the computer of the target entity. Upon displaying the user interface on the computer of the target entity, the computer of the acquiring entity may then receive one or more electronic inputs corresponding to each subcomponent modeling computer-environment integration risk component associated with the questionnaire from a user of the computer of the target entity. The user of the computer of the target entity may provide the one or more electronic inputs corresponding to each subcomponent modeling computer-environment integration risk component associated with the questionnaire by interacting with the user interface of the computer of the target entity via an input device, such as a touch screen, a mouse, a keyboard, a keypad, and others.

In some embodiments, upon displaying the user interface on the computer of the target entity, the computer of the acquiring entity may then receive one or more electronic inputs corresponding to each subcomponent modeling computer-environment integration risk component associated with the questionnaire from a querying a database associated with the computer of the target entity. In some embodiments, upon displaying the user interface on the computer of the target entity, the computer of the acquiring entity may on its own determine a status of one or more attributes associated with the questionnaire. In one instance, the computer of the acquiring entity may install an executable file on the computer of the target entity, and the executable file may scan an operating system and a hardware system of the computer of the target entity, and then transmit the scanning results to the computer of the acquiring entity. The computer of the acquiring entity may then analyze the scanning results to identify the status of the one or more attributes associated with the questionnaire. In another instance, the computer of the acquiring entity may install an software module on the computer of the target entity, and the software module may monitor operations of an operating system and a hardware system of the computer of the target entity, and then transmit the operation results to the computer of the acquiring entity. The computer of the acquiring entity may then analyze the operation results to identify the status of the one or more attributes associated with the questionnaire.

The computer of the acquiring entity may further query one or more databases. The one or more databases may be associated with the computing environment of the target entity. The computer of the acquiring entity may query the databases to receive data associated with the set of the subcomponents modeling a computer-environment integration risk component.

In a next step 604, a computer of the acquiring entity is configured to assign an integration risk score to each subcomponent according to each respective one or more electronic inputs corresponding to evaluations for the respective subcomponent. In some embodiments, the computer of the acquiring entity may be configured to assign the integration risk score to each subcomponent according to each respective one or more electronic inputs corresponding to evaluations of the data received from the one or more databases. In some embodiments, the computer of the acquiring entity may be configured to assign the integration risk score to each subcomponent according to each respective one or more electronic inputs corresponding to evaluations for the respective subcomponent as well as the data received from the one or more databases.

In some embodiments, the computer of the acquiring entity may execute a scoring module, which may assign a risk score to each electronic input answer/response and the risk score may depend to some extent on the risk associated to each indicator and/or component/subcomponent analyzed, and the type of the target entity analyzed, among others. The risk score may range from 0% to a maximum of 100% per question; however the sum of all the maximum risk scores per set of questions of each risk component may sum up to a maximum of 100%. Then, scoring module may compute the total risk score per information risk indicator by summing the individual risk scores of the electronic input responses included in each set of questions, and the total risk score may sum up to a maximum of 100% per information risk indicator.

In a next step 606, a computer of the acquiring entity is configured to identify one or more integration gaps corresponding to the integration of the computer environment of the acquiring entity and the target entity determined based on the integration risk score of each subcomponent. The one or more integration gaps may be associated with at least one subcomponent of the set of subcomponents.

In some embodiments, the computer of the acquiring entity may process overall integration risk score of each subcomponent, which may provide an analysis of the integration gaps in the integration of the information risk programs of the disparate computer environments of the acquiring entity and the target entity. If the risk score ranges from 0% to 9%, then the risk may be characterized as nominal risk; if the risk score ranges from 10% to 29%, then the risk may be characterized as low risk; if the risk score ranges from 30% to 69%, then the risk may be characterized as medium risk; and if the risk score ranges from 70% to 100%, then the risk may be characterized as high risk.

In a next step 608, a computer of the acquiring entity may analyze the obtained information concerning the overall integration risk score of each subcomponent, and any other suitable information to identify one or more integration gaps corresponding to the integration of the computer environment of the acquiring entity and the target entity in the integration process, and then recommend one or more activities in an appropriate action plan to address the one or more integration gaps. In other words, the computer of the acquiring entity may be configured to generate an integration project, which may include one or more action plans having a set of activities addressing the one or more integration gaps. Upon the completion of the set of activities, the computer environment of the acquiring entity and the target entity may then be integrated.

In some embodiments, the computer of the acquiring entity may generate and then execute the integration project for assessing the computer system and environment of the target entity and a risk program associated with the target entity. The execution of the integration project may initiate the execution of the one or more action plans, which may allow the computer system of the acquiring entity and/or the target entity to align their information risk program with the computer system of the other entity. The integration project may include, but not limited to, a set of activities per key area of each information risk component included in each information risk indicator, and the sets of activities may have been previously generated by the computer of the acquiring entity according to questions of the questionnaire and the responses of questions provided by the computer of the target entity. The computer of the acquiring entity may also define an implementation time-frame to implement each set of activities, and the time-frame may depend on information such as integration risk score, a risk indicator analyzed, the risk component analyzed, key area analyzed, type of entity analyzed, and others. The computer of the acquiring entity may feed the implementation time-frame and other suitable information in an internal database and allow the tracking of the progress and success of the action plans, and among any other analysis required.

In a next step 610, a computer of the acquiring entity is configured to cause the at least one subcomponent of the target entity to update according to the one or more action plans. In some embodiments, the computer of the acquiring entity may be configured to cause the at least one subcomponent of the target entity to be stopped according to the one or more action plans. In some embodiments, the computer of the acquiring entity may be configured to cause the at least one subcomponent of the target entity to be replaced with another subcomponent according to the one or more action plans.

The one or more action plans may include information for modifying the at least one subcomponent to enable operational and seamless integration of the computer system and environment of the acquiring entity and the target entity. Once the at least one subcomponent of the target entity is modified according to the one or more action plans, then the integration of the computer systems and environment of the acquiring entity and the target entity is initiated and completed within a pre-defined time period.

In one example for integrating disparate computer system and environment of the acquiring entity and the target entity, the computer of the target entity may have a software application ABC of a particular version that may not be suitable for running on an operating system specification XYZ of the computer of the acquiring entity. In such a case, based on the execution of the exemplary method 600, both the software application ABC and the operating system specification XYZ of the acquiring entity and the target entity respectively may receive a particular risk score during the pre-integration analysis, and then depending on the risk score, at least one of the software application ABC or the operating system specification XYZ is updated/modified or removed to enable the operational integration of the computer system and environment of the acquiring entity and the target entity.

In another example for integrating disparate computer systems and environments of the acquiring entity and the target entity, based on the execution of the exemplary method 600, the system herein may assign a particular risk score during the pre-integration analysis to software applications of the acquiring entity and the target entity respectively. Depending on the risk score, a computer of the target entity or the acquiring entity may be configured to execute one or more software applications, for example, a first application, in a secured manner to separate the execution of the first application from the rest of the applications in the computer of the target entity or the acquiring entity post integration. Such separation of execution may be known as a sandbox. The integrated system may be configured to provide a secured set of resources for the first application to execute such that any malicious actions of the first application may be redirected, monitored, and recorded. The integrated system may be configured to operate the first application in the sandbox before allowing the first application to run natively on the computer of the target entity or the acquiring entity in the integrated computer system. To execute the first application in such a secure manner, the system may be configured to utilize a dynamic optimization framework. The dynamic optimization framework may include a runtime code manipulator communicatively coupled to an anti-malware module. The runtime code manipulator and the anti-malware module may be configured to intercept an attempted execution of the first application, rewrite instructions accessing sensitive system resources, execute the rewritten executions to secured system resources, and determine whether the actions committed by the first application are malicious, to enable effective operational integration of the computer system and environment of the acquiring entity and the target entity.

In yet another example for integrating disparate computer systems and environments of the acquiring entity and the target entity, based on the execution of the exemplary method 600, the system herein may assign a particular risk score during the pre-integration analysis to software applications of the acquiring entity and the target entity respectively. Depending on the risk score, access control is used to provide isolation and sandboxing for different software applications of both the acquiring entity and the target entity. For example, in a first computing device of an acquiring entity, each application may be assigned a first identification name, and as a result, the files that belong to different applications can have different access control permissions, and applications cannot access each other's files due to access control isolation. Moreover, each application of the acquiring entity and the target entity may be controlled to access only a particular set of resources, and thereby enable effective operational integration of the computer system and environment of the acquiring entity and the target entity.

Figure 7:
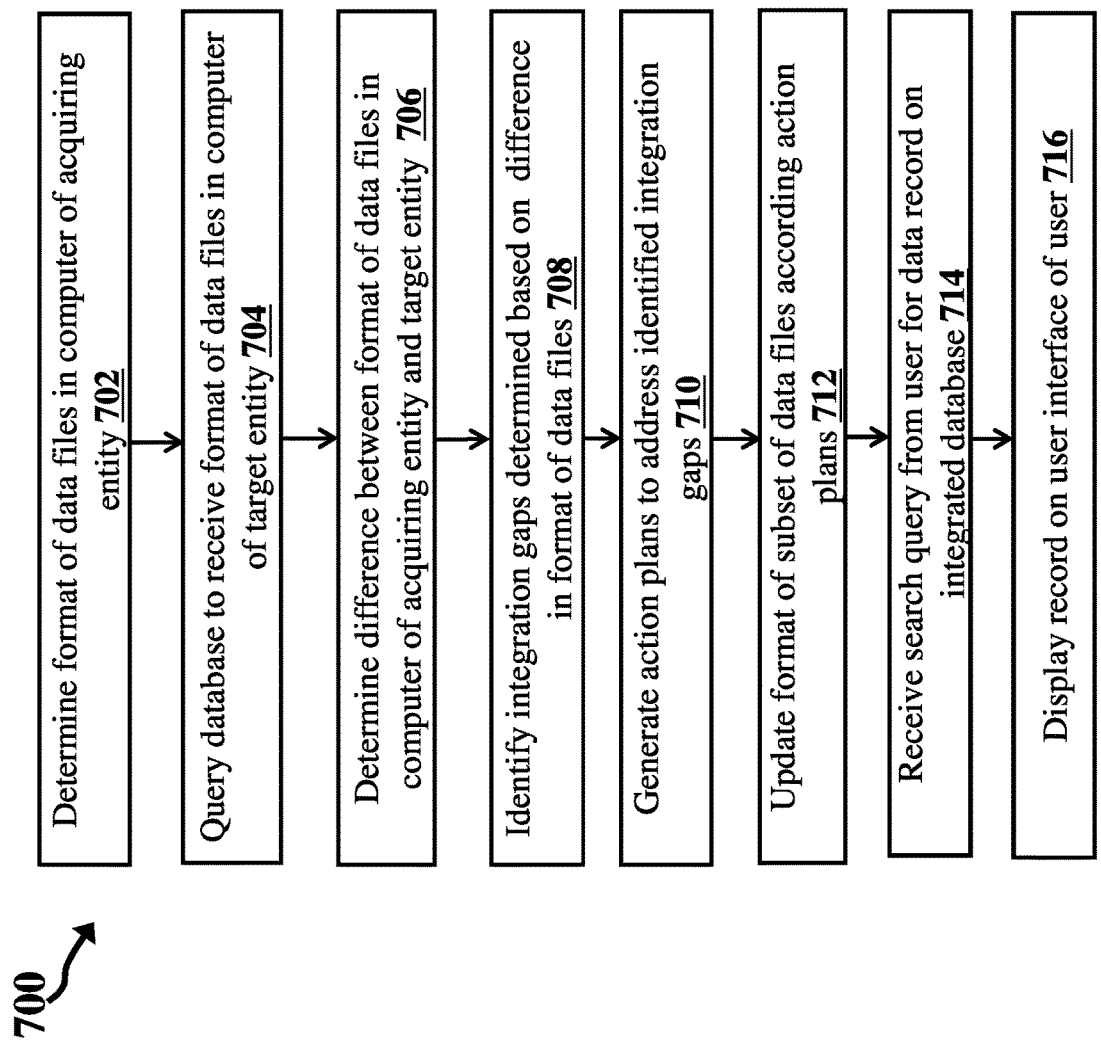
FIG. 7 illustrates execution for integrating disparate computer environments, according to an exemplary embodiment.

FIG. 7 shows execution steps for integrating disparate computer environments, according to an exemplary method 700. The exemplary method 700 shown in FIG. 7 comprises execution steps 702, 704, 706, 708, 710, 712, 714, and 716. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 700 of FIG. 7 is described as being executed by a single computer, referred to as a computer of an acquiring entity in this exemplary embodiment. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as the computer of the acquiring entity described herein.

In a first step 702, a computer of an acquiring entity may determine a format of data files of data records stored in one or more databases associated with a computing environment of the acquiring entity. The computer of the acquiring entity may determine the format of data files corresponding to each category of data records stored in databases.

In a next step 704, a computer of the acquiring entity may query one or more databases associated with a computing environment of a target entity to receive a format of data files corresponding to each category of data records stored in the one or more databases associated with the computing environment of the target entity.

In a next step 706, a computer of the acquiring entity may determine a subset of data files corresponding to each category of the data records stored in the or more databases associated with the computing environment of the target entity having the format which is different from the format of the data files in the category of the data records stored in the or more databases associated with the computing environment of the acquiring entity.

In a next step 708, a computer of the acquiring entity may identify one or more integration gaps corresponding to the integration of the computer environment of the acquiring entity and the target entity determined based on format of the subset of data files. The one or more integration gaps may be associated formatting of the subset of data files. In some embodiments, the computer of the acquiring entity may assign a format value to each of the subset of data files. The computer of the acquiring entity may assign the format value to each of the subset of data files based on analysis of the amount of formatting that may be required or is different in each of the subset of data files. The computer of the acquiring entity may also process the format value to each of the subset of data files, which may provide an analysis of the integration gaps in the integration of an information risk programs of the disparate computer systems and environments of the acquiring entity and the target entity. If the value ranges from 0% to 9%, then the risk may be characterized as nominal risk; if the value ranges from 10% to 29%, then the risk may be characterized as low risk; if the value ranges from 30% to 69%, then the risk may be characterized as medium risk; and if the value ranges from 70% to 100%, then the risk may be characterized as high risk.

In a next step 710, a computer of the acquiring entity may analyze the format value to each of the subset of data files, and any other suitable information to identify one or more integration gaps corresponding to the integration of the computer system and environment of the acquiring entity and the target entity in the integration process. Then the computer of the acquiring entity may recommend one or more activities in an appropriate action plan to address the one or more integration gaps. In other words, the computer of the acquiring entity may generate the integration project, which may include one or more action plans having a set of activities addressing the one or more integration gaps. Upon the completion of the set of activities, the computer of the acquiring entity may initiate a process where the data records stored in one or more databases associated with a computing environment of the acquiring entity and the target entity may be integrated.

In a next step 712, a computer of the acquiring entity may format the subset of data files in accordance with the one or more action plans. The one or more action plans may include generation of an identifier corresponding to each of the subset of data files that is updated that links updated format of each of the subset of data files with original format of each of the subset of data files. For instance, if there is a first data file having a first format ABC, which is being formatted to a second format XYZ, then the computer of the acquiring entity may generate an identifier DEF corresponding to the first data file where the identifier DEF provides information corresponding to the first data file and change of the format of the first data file from the first format ABC to the second format XVZ.

In a next step 714, upon the computer of the acquiring entity receiving from a user operating a user computing device, a request to search a record in an integrated database containing the data records of the acquiring entity and the target entity, the computer of the acquiring entity may then determine whether the user is from the acquiring entity or the target entity based on a username identifier associated with the user. The computer of the acquiring entity may search a database, which may store username identifiers of all users of the acquiring entity and the target entity to determine whether the user is from the acquiring entity or the target entity based on a username identifier associated with the user.

In a next step 716, upon the computer of the acquiring entity determining that the user is from the target entity, then the computer of the acquiring entity may grant the user authorization/access to generate a query to search the record using keywords associated with the original format of each of the subset of data files. The computer of the acquiring entity may then identify the record using the identifier corresponding to the keywords. The computer of the acquiring entity may then display the record on the user interface of the user computing device.

In one example for integrating disparate computer system and environment of the acquiring entity and the target entity, the computer of the acquiring entity and the target entity may have database records, which are of different formats but belong to a same category of record. For example, a first database record may be stored in a first format in the acquiring entity and a second format in the target entity. Such database records may then require different search query techniques in order to search for them within the databases they are stored. During integration of the computer system and environment of the acquiring entity and the target entity, all the database records of both the target entity and the acquiring entity are merged and converted into one format. During the merging process, a new identifier is created for the database records of either the acquiring entity or the target entity whose format has been converted, and then the new identifier is linked to an old identifier of an old format of the same database records. This enables users of computing systems of both the target entity and the acquiring entity to build a search query to search a particular data record using old identifiers in an integrated database of the integrated computing system, as the old identifier links to the new identifier to identify the searched database record. A database table may store relationships between new identifiers and old identifiers, and a server computer of the integrated computing system may use the database table to check the relationships between the new identifiers and the old identifiers to search any particular data record, which has been queried by any particular user of the acquiring entity or the target entity.

FIG. 8 is a system 800 for integrating disparate computer systems. The system 800 may include a sub-system for an acquiring entity 802 and a sub-system for a target entity 804. The sub-system for the acquiring entity 802 and the sub-system for the target entity 804 are connected to each other and communicate via a network 806. The examples of the network 806 may include, but are not limited to, private or public LAN, WLAN, MAN, WAN, and Internet. The network 806 may include both wired and wireless communications according to one or more standards and/or via one or more transport mediums. The communication over the network 806 may be performed in accordance with various communication protocols such as Transmission Control Protocol and Internet Protocol (TCP/IP), User Datagram Protocol (UDP), and IEEE communication protocols. In one example, the network 806 may include wireless communications according to Bluetooth specification sets, or another standard or proprietary wireless communication protocol. The network 806 may also include communications over a cellular network, including, e.g. a GSM (Global System for Mobile Communications), CDMA (Code Division Multiple Access), or EDGE (Enhanced Data for Global Evolution) network.

The sub-system for the acquiring entity 802 may include a plurality of computing devices 808a-808d (referred to as 808). The plurality of computing devices 808 are connected to each other and communicate via a network 810. Each computing device 808 may be any portable or non-portable computing device with a processor/microcontroller and/or any other electronic component that performs one or more operations according to one or more programming instructions. The examples of the computing devices 808 may include, but are not limited to, a cellular phone, a tablet computer, a smart watch, a personal data assistant, a gaming console, a laptop, or a personal computer. The computing devices 808 may be capable of communicating with each other through the network 810 using wired or wireless communication capabilities.

One of the plurality of computing device 808 may be configured to comprise the risk management subsystem of FIG. 1. For example, computing device 808a has a processor configured to execute a module manager, a data processing module, a scoring module, and a post-implementation module. This computing device 808a executes the software configured for integrating the acquiring entity system 802 and the target entity system 804. Although the example embodiment describes this computing device as being hosted by the acquiring entity, the integration computing device configured for integrating the acquiring entity system 802 and target entity system 804 can be a target entity computing device in other embodiments.

The sub-system for the target entity 804 may include a plurality of computing devices 812a-812d (referred to as 812). The plurality of computing devices 812 are connected to each other and communicate via a network 814. Each computing device 812 may be any portable or non-portable computing device with a processor/microcontroller and/or any other electronic component that performs one or more operations according to one or more programming instructions. The examples of the computing devices 812 may include, but are not limited to, a cellular phone, a tablet computer, a smart watch, a personal data assistant, a gaming console, a laptop, or a personal computer. The computing devices 812 may be capable of communicating with each other through the network 812 using wired or wireless communication capabilities.

During pre-integration analysis for integrating the sub-system of the acquiring entity 802 and the sub-system of the target entity 804, the integration computing device may determine that a computing device 812a of the target entity 804 have a first software application of a particular version that may not be suitable for running on an operating system first specification of a computing device 808b of the acquiring entity 802. In such a case, based on the execution of the method of the pre-integration analysis, the integration computing device 808a may assign a particular risk score during the pre-integration analysis to both the first software application and the operating system first specification, and then depending on the risk score, the integration computing device 808a updates, modifies, or removes at least one of the first software application or the operating system first specification to enable the operational integration of the computer system and environment of the acquiring entity and the target entity.

In some embodiments, during the pre-integration analysis for integrating the sub-system of the acquiring entity 802 and the sub-system of the target entity 804, the integration computer 808a may assign the computing device 808b of the acquiring entity 802 a particular risk score, and depending upon the risk score, during the integration process, the computing device 808b of the acquiring entity 802 may be isolated and not integrated during the integration of the sub-system of the acquiring entity 802 and the sub-system of the target entity 804. In such a case, access control may be used to provide isolation for the computing device 808b of the acquiring entity 802 and sandboxing for different software applications of both the acquiring entity 802 and the target entity 804.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A computer-implemented method for integrating disparate computer environments, the method comprising:
   determining, by a computer of an acquiring entity, a status of one or more attributes associated with inputs to a questionnaire regarding operation of a target entity computer having a set of subcomponents operable on a target entity network, wherein the attributes associated with the inputs to the questionnaire contain elements of the acquiring entity network and the target entity network for a computer-environment integration of the set of subcomponents into the acquiring entity network, and wherein at least one of the inputs is associated with an integration risk score indicating an amount of risk associated with at least one of the subcomponents;
   assigning, by the computer of the acquiring entity, the integration risk score to each subcomponent according to evaluations of the status of one or more attributes for the respective subcomponent including a task status of one or more tasks of the target entity computer and an implementation timeline;
   identifying, by the computer of the acquiring entity, one or more formatting integration gaps corresponding to the integration of a set of subcomponents of the acquiring entity and the set of subcomponents of the target entity determined based on the integration risk score of each subcomponent and a format value corresponding to an amount of formatting that is required for each of the set of subcomponents, wherein the one or more formatting integration gaps are associated with at least one of the set of subcomponents of the target entity;
   generating, by the computer of the acquiring entity, an integration executable comprising machine-readable instructions addressing the one or more formatting integration gaps, wherein upon completion of the machine-readable instructions, the set of subcomponents of the acquiring entity and the set of subcomponents of the target entity are integrated; and
   causing, by the computer of the acquiring entity running the integration executable comprising machine-readable instructions, a modification of the at least one subcomponent of the target entity by terminating the at least one subcomponent from the target entity network and executing the at least one subcomponent in isolation.

2. The computer-implemented method according to claim 1, further comprising:
   generating, by the computer of the acquiring entity, a user interface configured to be displayed on the computer of the target entity to display the questionnaire regarding operation of the computer environment associated with the computer of the target entity.

3. The computer-implemented method according to claim 2, further comprising:
   receiving, by the computer of the acquiring entity, one or more electronic inputs corresponding to each subcomponent modeling computer-environment integration risk component associated with the questionnaire upon displaying the user interface on the computer of the target entity.

4. The computer-implemented method according to claim 3, further comprising:
   querying, by the computer of the acquiring entity, one or more databases associated with the computing environment of the target entity to receive data associated with the set of the subcomponents modeling the computer-environment integration risk component.

5. The computer-implemented method according to claim 4, further comprising:
  assigning, by the computer of the acquiring entity, the integration risk score to each subcomponent according to each respective one or more electronic inputs corresponding to evaluations for the respective subcomponent and the data received from the one or more databases.

6. The computer-implemented method according to claim 1, further comprising:
  determining, by the computer of the acquiring entity, whether the integration risk score satisfies a predetermined integration risk threshold.

7. The computer-implemented method according to claim 1, further comprising:
  assessing, by the computer of the acquiring entity, a progress for each set of activities in accordance with a predetermined time-frame indicating a projected completion date for the set of activities.

8. The computer-implemented method according to claim 7, further comprising:
  continuously tracking, by the computer of the acquiring entity, the progress for each set of activities based on an actual time spent executing each set of activities.

9. The computer-implemented method according to claim 7, further comprising:
  determining, by the computer of the acquiring entity, a time-frame of each set of activities based a factor selected from a group consisting of: an amount of activities in the set of activities, a complexity of activities in the set of activities, a key area addressed by the set of activities, a risk component comprising the key area, a risk indicator comprising the risk component, a type of the acquiring entity, a type of the target entity, and a characteristic of a computing environment.

10. A system for integrating disparate computer environments, the system comprising:
  a computer of a target entity; and
  a computer of an acquiring entity, wherein the computer of the acquiring entity is configured to:
    generate a user interface configured to be displayed on a computer of a target entity to display a questionnaire regarding operation of a computer environment associated with the computer of the target entity, wherein the questionnaire is associated with a set of subcomponents modeling a computer-environment integration risk component;
    upon displaying the user interface on the computer of the target entity, receive one or more electronic inputs corresponding to each subcomponent modeling computer-environment integration risk component associated with the questionnaire, wherein at least one of the one or more electronic inputs is associated with an integration risk score indicating an amount of risk associated with the corresponding subcomponent;
    query one or more databases associated with the computing environment of the target entity to receive data associated with the set of the subcomponents modeling the computer-environment integration risk component;
    assign the integration risk score to each subcomponent according to each respective one or more electronic inputs corresponding to evaluations for the respective subcomponent and the data received from the one or more databases including a task status of one or more tasks of the target entity computer and an implementation timeline;
    identify one or more formatting integration gaps corresponding to the integration of the computer environment of the acquiring entity and the target entity determined based on the integration risk score of each subcomponent and a format value corresponding to an amount of formatting that is required for each of the set of subcomponents, wherein the one or more formatting integration gaps are associated with at least one subcomponent of the set of subcomponents;
    generate an integration executable comprising machine-readable instructions addressing the one or more formatting integration gaps, wherein upon completion of the machine-readable instructions, the computer environment of the acquiring entity and the target entity are integrated; and
    cause a modification of the at least one subcomponent based on executing the machine-readable instructions by terminating the at least one subcomponent and executing the at least one subcomponent in isolation.

11. The system according to claim 10, wherein the computer of the acquiring entity is further configured to:
  determine whether the integration risk score satisfies a predetermined integration risk threshold.

12. The system according to claim 10, wherein the computer of the acquiring entity is further configured to:
  assess a progress for a set of activities addressing the one or more formatting integration gaps in accordance with a predetermined time-frame indicating a projected completion date for the set of activities.

13. The system according to claim 12, wherein the computer of the acquiring entity is further configured to:
  continuously track the progress for the set of activities based on an actual time spent executing the set of activities.

14. The system according to claim 12, wherein the computer of the acquiring entity is further configured to:
  determine a time-frame of the set of activities based a factor selected from a group consisting of: an amount of activities in the set of activities, a complexity of activities in the set of activities, a key area addressed by the set of activities, a risk component comprising the key area, a risk indicator comprising the risk component, a type of the acquiring entity, a type of the target entity, and a characteristic of a computing environment.

* * * * *